US 11,777,124 B2

(12) United States Patent
Murdock et al.

(10) Patent No.: US 11,777,124 B2
(45) Date of Patent: Oct. 3, 2023

(54) PROTON-CONDUCTING PBI MEMBRANE PROCESSING WITH ENHANCED PERFORMANCE AND DURABILITY

(71) Applicant: University of South Carolina, Columbia, SC (US)

(72) Inventors: Laura A. Murdock, Columbia, SC (US); Fei Huang, West Columbia, SC (US); Brian C. Benicewicz, Columbia, SC (US)

(73) Assignee: University of South Carolina, Columbia, SC (US)

( * ) Notice: Subject to any disclaimer, the term of this patent is extended or adjusted under 35 U.S.C. 154(b) by 285 days.

(21) Appl. No.: 17/194,417

(22) Filed: Mar. 8, 2021

(65) Prior Publication Data

US 2021/0280883 A1     Sep. 9, 2021

Related U.S. Application Data

(60) Provisional application No. 62/985,977, filed on Mar. 6, 2020.

(51) Int. Cl.
*H01M 8/103*     (2016.01)
*H01M 8/1004*     (2016.01)
(Continued)

(52) U.S. Cl.
CPC .............. *H01M 8/103* (2013.01); *C08J 5/18* (2013.01); *C08K 3/32* (2013.01); *C25B 13/08* (2013.01);
(Continued)

(58) Field of Classification Search
CPC .............. H01M 8/103; H01M 8/1004; H01M 2008/1095; H01M 2300/0082; C08J 5/18;
(Continued)

(56) References Cited

U.S. PATENT DOCUMENTS

| 4,473,682 A | 9/1984 | Calundann et al. |
| 4,522,974 A | 6/1985 | Calundann et al. |

(Continued)

FOREIGN PATENT DOCUMENTS

| CN | 101338038 | 1/2009 |
| CN | 101814611 | 8/2010 |

(Continued)

OTHER PUBLICATIONS

Üregen, Nurhan, et al. "Development of polybenzimidazole/ graphene oxide composite membranes for high temperature PEM fuel cells." International Journal of Hydrogen Energy 42.4 (2017): 2636-2647. (Year: 2017).*

(Continued)

*Primary Examiner* — Stewart A Fraser
(74) *Attorney, Agent, or Firm* — Dority & Manning, P.A.

(57) ABSTRACT

The current disclosure teaches one to achieve PBI membranes with high ionic conductivity and low mechanical creep for the first time. This is in contrast to previous teachings of PBI membrane fabrication methods, which yield PBIs with either high ionic conductivity and high mechanical creep or low ionic conductivity and low mechanical creep. The membranes produced according to the disclosed process provide doped membranes for applications in fuel cells and electrolysis devices such as electrochemical separation devices.

15 Claims, 36 Drawing Sheets

(51) Int. Cl.

| | | |
|---|---|---|
| *C25B 13/08* | (2006.01) | |
| *C08J 5/18* | (2006.01) | |
| *C08K 3/32* | (2006.01) | |
| *H01M 8/10* | (2016.01) | |

(52) U.S. Cl.
CPC ....... *H01M 8/1004* (2013.01); *C08J 2379/04* (2013.01); *C08K 2003/329* (2013.01); *H01M 2008/1095* (2013.01); *H01M 2300/0082* (2013.01)

(58) Field of Classification Search
CPC .................. C08J 2379/04; C08K 3/32; C08K 2003/329; C25B 13/08
See application file for complete search history.

(56) References Cited

U.S. PATENT DOCUMENTS

| | | | |
|---|---|---|---|
| 4,746,694 | A | 5/1988 | Charbonneau et al. |
| 4,786,567 | A | 11/1988 | Skyllas-Kazacos et al. |
| 4,898,917 | A | 2/1990 | Sansone |
| 5,114,612 | A | 5/1992 | Benicewicz et al. |
| 5,198,551 | A | 5/1993 | Benicewicz et al. |
| 5,315,011 | A | 5/1994 | Benicewicz et al. |
| 5,382,665 | A | 1/1995 | Benicewicz et al. |
| 5,475,133 | A | 12/1995 | Douglas et al. |
| 5,575,949 | A | 11/1996 | Benicewicz et al. |
| 5,583,169 | A | 12/1996 | Wrobleski et al. |
| 5,658,649 | A | 8/1997 | Benicewicz et al. |
| 5,840,376 | A | 11/1998 | Smith et al. |
| 6,458,968 | B2 | 10/2002 | Benicewicz et al. |
| 6,765,076 | B2 | 7/2004 | Benicewicz et al. |
| 6,987,163 | B2 | 1/2006 | Cabasso et al. |
| 7,148,311 | B2 | 12/2006 | Shao et al. |
| 7,317,066 | B2 | 1/2008 | Shao et al. |
| 7,332,552 | B2 | 2/2008 | Li et al. |
| 7,661,542 | B2 | 2/2010 | Baurmeister et al. |
| 7,696,302 | B2 | 4/2010 | Calundann et al. |
| 7,736,778 | B2 | 6/2010 | Uensal et al. |
| 7,736,779 | B2 | 6/2010 | Uensal et al. |
| 7,745,030 | B2 | 6/2010 | Uensal et al. |
| 7,820,314 | B2 | 10/2010 | Calundann et al. |
| 7,837,763 | B2 | 11/2010 | Uensal et al. |
| 8,142,917 | B2 | 3/2012 | Uensal et al. |
| 8,277,983 | B2 | 10/2012 | Calundann et al. |
| 8,323,810 | B2 | 12/2012 | Calundann et al. |
| 8,518,743 | B2 | 8/2013 | Tao et al. |
| 8,653,204 | B2 | 2/2014 | Hua et al. |
| 8,716,356 | B2 | 5/2014 | Calundann et al. |
| 8,796,372 | B2 | 8/2014 | Nelson et al. |
| 8,865,796 | B2 | 10/2014 | Benicewicz et al. |
| 9,109,070 | B2 | 8/2015 | Benicewicz et al. |
| 9,130,219 | B1 | 9/2015 | Huang et al. |
| 9,187,643 | B2 | 11/2015 | Benicewicz et al. |
| 9,249,250 | B2 | 2/2016 | Benicewicz et al. |
| 9,359,453 | B2 | 6/2016 | Benicewicz et al. |
| 9,475,922 | B2 | 10/2016 | Benicewicz et al. |
| 9,504,256 | B2 | 11/2016 | Wang et al. |
| 9,598,541 | B2 | 3/2017 | Benicewicz et al. |
| 9,683,055 | B2 | 6/2017 | Benicewicz et al. |
| 9,732,169 | B2 | 8/2017 | Wang et al. |
| 9,773,953 | B2 | 9/2017 | Li et al. |
| 9,806,365 | B2 | 10/2017 | Benicewicz et al. |
| 9,884,935 | B2 | 2/2018 | Mohammadkhani et al. |
| 10,011,674 | B2 | 7/2018 | Viswanath et al. |
| 10,090,550 | B2 | 10/2018 | Cho et al. |
| 10,112,143 | B2 | 10/2018 | Kumar et al. |
| 11,180,621 | B2 | 11/2021 | Murdock et al. |
| 2004/0028976 | A1 | 2/2004 | Cabasso et al. |
| 2005/0142411 | A1 | 6/2005 | Aihara |
| 2005/0170252 | A1 | 8/2005 | Aihara |
| 2005/0186480 | A1 | 8/2005 | Aihara |
| 2005/0244694 | A1 | 11/2005 | Kiefer et al. |
| 2007/0218334 | A1 | 9/2007 | Bonorand |
| 2008/0038624 | A1* | 2/2008 | Belack ................ H01M 4/8864 |
| | | | 429/480 |
| 2008/0241627 | A1 | 10/2008 | Kim et al. |
| 2009/0098437 | A1 | 4/2009 | Choi et al. |
| 2011/0000615 | A1 | 1/2011 | Larson et al. |
| 2011/0003234 | A1 | 1/2011 | Martin et al. |
| 2011/0091789 | A1 | 4/2011 | Mofakhami et al. |
| 2011/0189484 | A1 | 8/2011 | Hopkins et al. |
| 2011/0196051 | A1* | 8/2011 | Lee ..................... H01M 8/1032 |
| | | | 525/410 |
| 2012/0115050 | A1 | 5/2012 | Kim et al. |
| 2012/0196188 | A1 | 8/2012 | Zhang et al. |
| 2012/0201988 | A1 | 8/2012 | Hansen et al. |
| 2012/0231253 | A1* | 9/2012 | Klaehn ................. C08L 61/28 |
| | | | 525/509 |
| 2013/0183603 | A1 | 7/2013 | Benicewicz et al. |
| 2014/0377687 | A1 | 12/2014 | Miyake et al. |
| 2015/0295262 | A1 | 10/2015 | Kunita et al. |
| 2016/0315343 | A1 | 10/2016 | Kurungot et al. |
| 2017/0098845 | A1 | 4/2017 | Kim et al. |
| 2018/0123155 | A1 | 5/2018 | Benicewicz et al. |
| 2019/0376189 | A1 | 12/2019 | Tarabukin |
| 2020/0087473 | A1 | 3/2020 | Murdock et al. |
| 2020/0091536 | A1 | 3/2020 | Benicewicz et al. |
| 2020/0091539 | A1 | 3/2020 | Benicewicz et al. |

FOREIGN PATENT DOCUMENTS

| | | |
|---|---|---|
| CN | 103881127 | 6/2014 |
| CN | 106750441 | 5/2017 |
| CN | 106750442 | 5/2017 |
| CN | 106784947 | 5/2017 |
| CN | 110791774 | 2/2020 |
| JP | 2016207608 | 12/2016 |
| KR | 20120061156 | 6/2012 |
| WO | WO 2005/014474 | 2/2005 |
| WO | WO 2008/060658 | 5/2008 |
| WO | WO 2011/151775 | 12/2011 |
| WO | WO 2013/108111 | 7/2013 |
| WO | WO 2014/111792 | 7/2014 |
| WO | WO 2014/111793 | 7/2014 |
| WO | WO 2019/200187 | 10/2019 |

OTHER PUBLICATIONS

EPO. "Extended European Search Report" *Euro. Pat. Ofc.* 19860547 (dated Jun. 22, 2022) pp. 1-11.

EPO. "Extended European Search Report" *Euro. Pat. Ofc.* 19860913 (dated Jun. 23, 2022) pp. 1-8.

Weidner, J.W. "Electrolyzer performance for producing hydrogen via a solar-driven hybrid-sulfur process" *J. Appl. Electrochem.* 46 (2016) pp. 829-839.

Carmo, et al. "A comprehensive review on PEM water electrolysis" *Int'l J. Hydrogen Energ.* 38 (2013) pp. 4901-4934.

Chan, et al. "Electrochemically Enabled Sustainability: Devices, Materials and Mechanisms for Energy Conversion" *CRC Press* (2014) p. 420.

Chang, et al. "One-Step Cationic Grafting of 4-Hydroxy-TEMPO and its Application in a Hybrid Redox Flow Battery with a Cross-linked PBI Membrane" *ChemSusChem* 10(16) (2017) pp. 3193-3197. (Abstract only).

Chen, et al. "High Temperature Creep Behavior of Phosphoric Acid-Polybenzimidazole Gel Membranes" *J. Polym. Sci. Part B: Polym. Phys.* 53 (2015) pp. 1527-1538.

Fishel, et al. "Solution Polymerization of Polybenzimidazole" *J. Polym. Sci. Part A: Polym. Chem.* 54 (2016) pp. 1795-1802.

Fishel, et al. "High Temperature Polymer Electrolyte Membrane Fuel Cells: Ch. 24—Electrochemical Hydrogen Pumping" *Springer Verlag* (2015) pp. 527-540.

Fishel, et al. "High Temperature Polymer Electrolyte Membrane Fuel Cells: Ch. 10—PBI Membranes Via the PPA Process" *Springer Verlag* (2015) pp. 217-238.

Garrick, et al. "Characterizing Voltage Losses in an $SO_2$ Depolarized Electrolyzer Using Sulfonated Polybenzimidazole Membranes" *J. Electrochem. Soc.* 164(14) (2017) pp. F1591-F1595.

(56) References Cited

OTHER PUBLICATIONS

Garrick, et al. "Polybenzimidazole Membranes for Hydrogen Production in the Hybrid Sulfur Electrolyzer" *ECS Transactions* 66(3) (2015) pp. 31-40.
Gokhale, et al. "Implementing PGM-free electrocatalysts in high-temperature polymer electrolyte membrane fuel cells" *Electrochem. Comm.* 93 (2018) pp. 91-94.
Gulledge, et al. "Investigation of Sequence Isomer Effects in AB-Polybenzimidazole Polymers" *J. Polym. Sci. Part A: Polym. Chem.* 52 (2014) pp. 619-628.
Gulledge, et al. "A New Sequence Isomer of AB-Polybenzimidazole for High-Temperature PEM Fuel Cells" *J. Polym. Sci. Part A: Polym. Chem.* 50 (2012) pp. 303-313.
Jang, et al. "Highly proton conductive, dense polybenzimidazole membranes with low permeability to vanadium and enhanced $H_2SO_4$ absorption capability for use in vanadium redox flow batteries" *J. Mater. Chem. A* 4(37) (2016) pp. 14342-14355.
Jayakody, et al. "NMR Studies of Mass Transport in High-Acid-Content Fuel Cell Membranes Based on Phosphoric Acid and Polybenzimidazole" *J. Electrochem. Soc.* 154(2) (2007) pp. B242-B246.
Li, et al. "Synthesis and Characterization of a New Fluorine-Containing Polybenzimidazole (PBI) for Proton-Conducting Membranes in Fuel Cells" *Fuel Cells* 13(5) (2013) pp. 832-842.
Li, et al. "Synthesis and properties of phenylindane-containing polybenzimidazole (PBI) for high- temperature polymer electrolyte membrane fuel cells (PEMFCs)" *J. Power Sources* 243 (2013) pp. 796-804.
Li, et al. "High temperature proton exchange membranes based on polybenzimidazoles for fuel cells" *Prog. Polym. Sci.* 34(5) (2009) pp. 449-477.
Luo, et al. "Porous poly(benzimidazole) membrane for all vanadium redox flow battery" *J. Power Sources* 312 (2016) pp. 45-54. (Abstract only).
Mader, et al. "Synthesis and Properties of Random Copolymers of Functionalised Polybenzimidazoles for High Temperature Fuel Cells" *Fuel Cells* 11(2) (2011) pp. 212-221.
Mader, et al. "Synthesis and Properties of Segmented Block Copolymers of Functionalised Polybenzimidazoles for High-Temperature PEM Fuel Cells" *Fuel Cells* 11(2) (2011) pp. 222-237.
Mader, et al. "Sulfonated Polybenzimidazoles for High Temperature PEM Fuel Cells" *Macromolecules* 43 (2010) pp. 6706-6715.
Mader, et al. "Polybenzimidazole/Acid Complexes as High-Temperature Membranes" *Adv. Polym. Sci.* 216 (2008) pp. 63-124.
Molleo, et al. "High Polymer Content 2,5-Pyridine-Polybenzimidazole Copolymer Membranes with Improved Compressive Properties" *Fuel Cells* 15(1) (2015) pp. 150-159.
Molleo, et al. "High Polymer Content 3,5-Pyridine-Polybenzimidazole Copolymer Membranes with Improved Compressive Properties" *Fuel Cells* 14(1) (2014) pp. 16-25.
Molleo, et al. "Encyclopedia of Sustainability Science and Technology: Ch. 13—Polybenzimidazole Fuel Cell Technology" *Springer Sci. Busi. Media* (2012) pp. 391-431.
Neutzler, et al. "Performance of vapor-fed direct dimethyl ether fuel cell utilizing high temperature polybenzimidazole polymer electrolyte membrane" *J. Power Sources* 216 (2012) pp. 471-474.
Noh, et al. "Vanadium Redox Flow Batteries Using meta-Polybenzimidazole-Based Membranes of Different Thicknesses" *ACS Appl. Mater. Interf.* 9(42) (2017) pp. 36799-36809.
Parasuraman, et al. "Review of material research and development for vanadium redox flow battery applications" *Electrochimica Acta* 101 (2013) pp. 27-40.
Peng, et al. "Thin skinned asymmetric polybenzimidazole membranes with readily tunable morphologies for high-performance vanadium flow batteries" *RSC Advances* 7 (2017) pp. 1852-1862.
Peng, et al. "A $H_3PO_4$ preswelling strategy to enhance the proton conductivity of a $H_2SO_4$-doped polybenzimidazole membrane for vanadium flow batteries" *RSC Advances* 6(28) (2016) pp. 23479-23488.
Perry, et al. "Advanced Redox-Flow Batteries: A Perspective" *J. Electrochem. Soc.* 163(1) (2016) pp. A5064-A5067.
Perry, et al. "A Comparative Study of Phosphoric Acid-Doped m-PBI Membranes" *J. Polym. Sci. Part B: Polym. Phys.* 52 (2014) pp. 26-35.
Prifti, et al. "Membranes for Redox Flow Battery Applications" *Membranes* 2 (2012) pp. 275-306.
Qian, et al. "Synthesis and Characterization of High Molecular Weight Hexafluoroisopropylidene- Containing Polybenzimidazole for High-Temperature Polymer Electrolyte Membrane Fuel Cells" *J. Polym. Sci. Part A: Polym. Chem.* 47 (2009) pp. 4064-4073.
Rastler, D. "Electrical energy storage technology options" *Electr. Power Res. Inst.* 1020676 (2010) pp. 1-161.
Razali, et al. "Exploring and Exploiting the Effect of Solvent Treatment in Membrane Separations" *ACS Appl. Mater. Interf.* 9 (2017) pp. 11279-11289.
Schönberger, et al. "Polybenzimidazole-Based Block Copolymers: From Monomers to Membrane Electrode Assemblies for High Temperature Polymer Electrolyte Membrane Fuel Cells" *J. Polym. Sci., Part A: Polym. Chem.* 55 (2017) pp. 1831-1843.
Seel, et al. "Polyphenylquinoxaline-based proton exchange membranes synthesized via the PPA Process for high temperature fuel cell systems" *J. Membr. Sci.* 405-406 (2012) pp. 57-67.
Seel, et al. "Handbook of Fuel Cells. Part II: Conductive membranes for low-temperature fuel cells: Ch. 19—High-temperature polybenzimidazole-based membranes" *John Wiley & Sons, Ltd.* (2009) pp. 1-13.
Shogbon, et al. "Determination of the Molecular Parameters and Studies of the Chain Conformation of Polybenzimidazole in DMAc/LiCl" *Macromolecules* 39 (2006) pp. 9409-9418.
Singh, et al. "Polybenzimidazole based random copolymers containing hexafluoroisopropylidene functional groups for gas separations at elevated temperatures" *Polymer* 119 (2017) pp. 134-141.
Skyllas-Kazacos, et al. "Vanadium Electrolyte Studies for the Vanadium Redox Battery—A Review" *ChemSusChem* 9(13) (2016) pp. 1521-1543.
Suarez, et al. "Multinuclear NMR Study of the Effect of Acid Concentration on Ion Transport in Phosphoric Acid Doped Poly(benzimidazole) Membranes" *J. Phys. Chem. B* 116 (2012) pp. 12545-12551.
Tang, et al. "Phosphoric acid-imbibed three-dimensional polyacrylamide/poly(vinyl alcohol) hydrogel as a new class of high-temperature proton exchange membrane" *J. Power Sources* 229 (2013) pp. 36-41.
Valtcheva, et al. "Crosslinked polybenzimidazole membranes for organic solvent nanofiltration (OSN): Analysis of crosslinking reaction mechanism and effects of reaction parameters" *J. Membr. Sci.* 493 (2015) pp. 568-579.
Wang, et al. "Sulfonated PBI Gel Membranes for Redox Flow Batteries" *J. Electrochem. Soc.* 166(8) (2019) pp. A1449-A1455.
Wang, et al. "Handbook of Thermoplastics: Ch. 19—Polybenzimidazoles" *CRC Press* (2015) pp. 617-667.
Xiao, et al. "High-Temperature Polybenzimidazole Fuel Cell Membranes via a Sol-Gel Process" *Chem. Mater.* 17 (2005) pp. 5328-5333.
Xiao, et al. "Synthesis and Characterization of Pyridine-Based Polybenzimidazoles for High Temperature Polymer Electrolyte Membrane Fuel Cell Applications" *Fuel Cells* 5(2) (2005) pp. 287-295.
Xie, et al. "Processing and Pretreatment Effects on Vanadium Transport in Nafion Membranes" *J. Electrochem. Soc.* 163(1) (2016) pp. A5084-A5089.
Yang, et al. "Fabrication of crosslinked polybenzimidazole membranes by trifunctional crosslinkers for high temperature proton exchange membrane fuel cells" *Intl. J. Hydrogen Energy* 43(6) (2018) pp. 3299-3307.
Yu, et al. "Synthesis of Poly (2,2'-(1,4-phenylene) 5,5'-bibenzimidazole) (para-PBI) and Phosphoric Acid Doped Membrane for Fuel Cells" *Fuel Cells* 9(4) (2009) pp. 318-324.
Yu, et al. "Synthesis and Properties of Functionalized Polybenzimidazoles for High-Temperature PEMFCs" *Macromolecules* 42 (2009) pp. 8640-8648.

(56) References Cited

OTHER PUBLICATIONS

Yuan, et al. "Advanced porous membranes with ultra-high selectivity and stability for vanadium flow batteries" *Energy Environ. Sci.* 9(2) (2016) pp. 269-272.

Zhang, et al. "Progress and prospects of next-generation redox flow batteries" *Energy Storage Mater.* 15 (2018) pp. 324-350.

Zhou, et al. "The use of polybenzimidazole membranes in vanadium redox flow batteries leading to increased coulombic efficiency and cycling performance" *Electrochimica Acta* 153 (2015) pp. 492-498.

ISA. "International Search Report and Written Opinion" PCT/US2019/050993 (dated Feb. 21, 2020) pp. 1-10.

ISA. "International Search Report and Written Opinion" PCT/US2019/051028 (dated Jan. 27, 2020) pp. 1-11.

ISA. "International Search Report and Written Opinion" PCT/US2019/051036 (dated Jan. 29, 2020) pp. 1-11.

ISA. "International Search Report and Written Opinion" PCT/US2021/048782 (dated Dec. 23, 2021) pp. 1-14.

\* cited by examiner

| Polymer wt% | Phosphoric acid wt% | X (mols PA/RU) |
|---|---|---|
| 14.5 | 50.4 | 11.0 |

FIGURE 3

| Polymer wt% | Phosphoric acid wt% | X (mols/RU) |
|---|---|---|
| 10.8 | 66.1 | 18.4 |

FIGURE 10

| Polymer wt% | Phosphoric acid wt% | X (molsPA/RU) |
|---|---|---|
| 10.6 | 69.3 | 20.5 |

FIGURE 13

| Polymer wt% | Phosphoric acid wt% | X (molsPA/RU) |
|---|---|---|
| 13.6 | 69.2 | 16.0 |

FIGURE 16

| Polymer wt% | Phosphoric acid wt% | X (molsPA/RU) |
|---|---|---|
| 12.77 | 62.13 | 17.0 |

FIGURE 19

| Membrane | Steady-State Creep Compliance (Pa$^{-1}$) |
|---|---|
| Gel para-PBI | $10.3 \times 10^{-6}$ |
| Dried para-PBI re-doped @ rt | $2.00 \times 10^{-6}$ |
| Dried para-PBI re-doped @ 40° C | $1.17 \times 10^{-6}$ |
| Dried para-PBI re-doped @ 70° C | $1.31 \times 10^{-6}$ |
| Dried para-PBI re-doped @ 95° C | $1.25 \times 10^{-6}$ |

FIGURE 22

| Membrane | Polymer (wt%) | Phosphoric acid (wt%) | X (mols acid/RU) |
|---|---|---|---|
| Gel para-PBI | 5.6 | 57.3 | 32.3 |
| Dense para-PBI re-doped @ rt | 14.5 | 50.4 | 11.0 |
| Dense para-PBI re-doped @ 40° C | 10.8 | 66.1 | 18.4 |
| Dense para-PBI re-doped @ 70° C | 10.6 | 69.3 | 20.5 |
| Dense para-PBI re-doped @ 95° C | 13.6 | 69.2 | 16.0 |

FIGURE 23

| Membrane | BET Surface Area (m$^2$/g) |
|---|---|
| Dried para-PBI re-doped @ rt | 1005.1 ± 11.2 |
| Gel para-PBI | 515.6 ± 7.7 |

FIGURE 24

| Membrane | Polymer (wt%) | Phosphoric acid (wt%) | X (mols acid/RU) |
|---|---|---|---|
| Conventionally imbibed meta-PBI | 27.7 | 53.1 | 6.0 |
| Dense para-PBI re-doped @ rt | 14.5 | 50.4 | 11.0 |

FIGURE 31

| Membrane | BET Surface Area (m$^2$/g) |
|---|---|
| Dense para-PBI re-doped @ rt | 1005.1 ± 11.2 |
| "Conventionally imbibed" meta-PBI | 281.0 ± 4.3 |

FIGURE 32

| Membrane | Polymer (wt%) | Phosphoric acid (wt%) | X (mols acid/RU) |
|---|---|---|---|
| Gel m/p-PBI | 16.8 | 57.6 | 10.8 |

FIGURE 35

PROTON-CONDUCTING PBI MEMBRANE PROCESSING WITH ENHANCED PERFORMANCE AND DURABILITY

TECHNICAL FIELD

The subject matter disclosed herein is generally directed to membranes that have high ionic conductivities and low mechanical creep properties.

BACKGROUND

Polybenzimidazole (PBI) is a glassy thermoplastic with exceptional thermal stability (427° C. Tg), broad chemical resistance, and the ability to function as a proton-acceptor or proton-donor. PBI is uniquely suited for moving protons, hydrogen, and water. For these reasons, PBI is highly suited for $H_2/CO_2$ separation membranes, fuel cell proton exchange membranes, and organic chemical pervaporation dehydration membranes—many for use at high temperature.

A novel synthetic process for producing high molecular weight PBIs, the "PPA Process" was developed at Rensselaer Polytechnic Institute with cooperation from BASF Fuel Cell GmbH. The general synthesis of PBI by this method requires the combination of a tetraamine with a dicarboxylic acid in polyphosphoric acid (PPA) in a dry environment. The step-growth polycondensation reaction typically occurs around 200° C. for 16-24 h in a nitrogen atmosphere, producing high molecular weight polymer. This solution is cast directly from PPA as a thin film on a substrate, and upon absorption of water, the PPA hydrolyzes in situ to form phosphoric acid (PA). Note that PPA is a good solvent for PBI while PA is a poor solvent. Under controlled hydrolysis conditions, a mechanically stable PBI gel membrane that is highly doped with PA is produced.

In one commercial usage, PA-doped m-PBI fuel cell membranes are produced and maintain thermal and physical stability while operating at high temperature. The PPA Process produces membranes with much higher proton diffusion coefficients and conductivities and creates a membrane with a proton-transport architecture superior to that of the conventionally imbibed PBI membrane. In addition, inherent viscosity data indicates that the PPA process produces polymers of much higher molecular weight. It has been shown that improved membrane morphology and increased molecular weight allow the polymer to retain much more phosphoric acid than traditionally cast PBI membranes. An increased PA doping level typically improves the conductivity of the membrane and may even increase the performance of the cell.

PBI films are known to have excellent properties such as high temperature stability, non-flammability, and high chemical resistance. Until recently, the process to making dense PBI films doped in PA has involved polymerization, dissolving the resulting polymer in an organic solvent such as dimethylacetamide (DMAc), casting the film, and removing the solvent in a series of washes, and doping in PA.

High temperature fuel cells need a membrane that is stable at high temperatures (160-220° C.), has high chemical stability, and high ionic conductivity. It is hard to design a membrane that meets these requirements while also achieving low degradation (i.e., extended durability) in such conditions. Accordingly, it is an object of the present invention to meet the requirements while achieving enhanced durability under more diverse conditions.

Citation or identification of any document in this application is not an admission that such a document is available as prior art to the present disclosure.

SUMMARY

The above objectives are accomplished according to the present disclosure by providing in a first embodiment a process for making PBI films. The process may include forming a gel PBI membrane via a PPA process, rinsing the gel PBI membrane, restraining the PBI membrane in at least an X-Y plane direction; drying the rinsed gel PBI membrane; and immersing the dried film into an inorganic or organic acid bath. Further, an acid-doped polyazole membrane may be made by the process in claim 1, wherein the ionic conductivity measured at 180° C. is at least 180 mS/cm and preferably greater than 200 mS/cm combined with a steady state creep compliance, Js0, of less than $5\times10^{-6}$ $Pa^{-1}$ and more preferably less than $3\times10^{-6}$ $Pa^{-1}$ when measured at 180° C. Still further, the method may produce a polyazole membrane wherein the doped membrane after immersion in an inorganic or organic acid bath has a BET surface area greater than 600 m2/g. Yet again, the acid bath may be a phosphoric acid bath. Moreover, the acid bath may be at temperatures of 20° C. to 120° C., preferably at temperatures of 20° C. to 95° C. Even further, the process may be used to form a polyazole membrane, wherein the acid bath is at temperatures of 20° C. to 120° C., preferably at temperatures of 20° C. to 95° C. Still again, the process may form a polyazole membrane, wherein the doped solids content of the membrane is greater than the solubility of the polymer in PPA. Yet further, the process may include a drying step including contacting the membrane with one or more substrates where at least one substrate is a porous substrate. Again still, the process may include PBI film wherein the polybenzimidazole of the film includes one or more of the following repeat units:

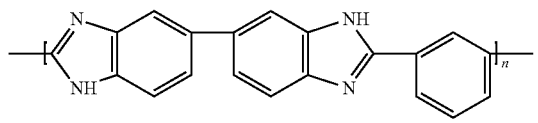 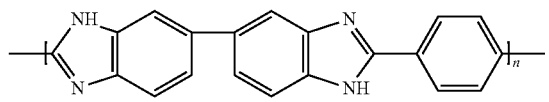

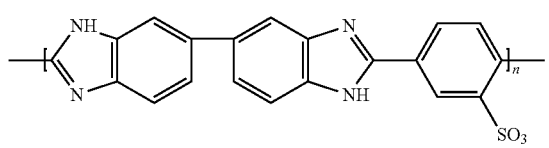 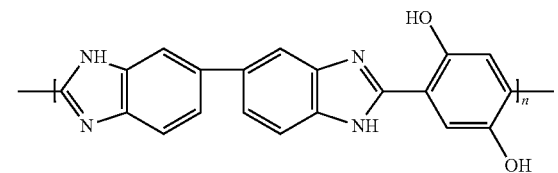

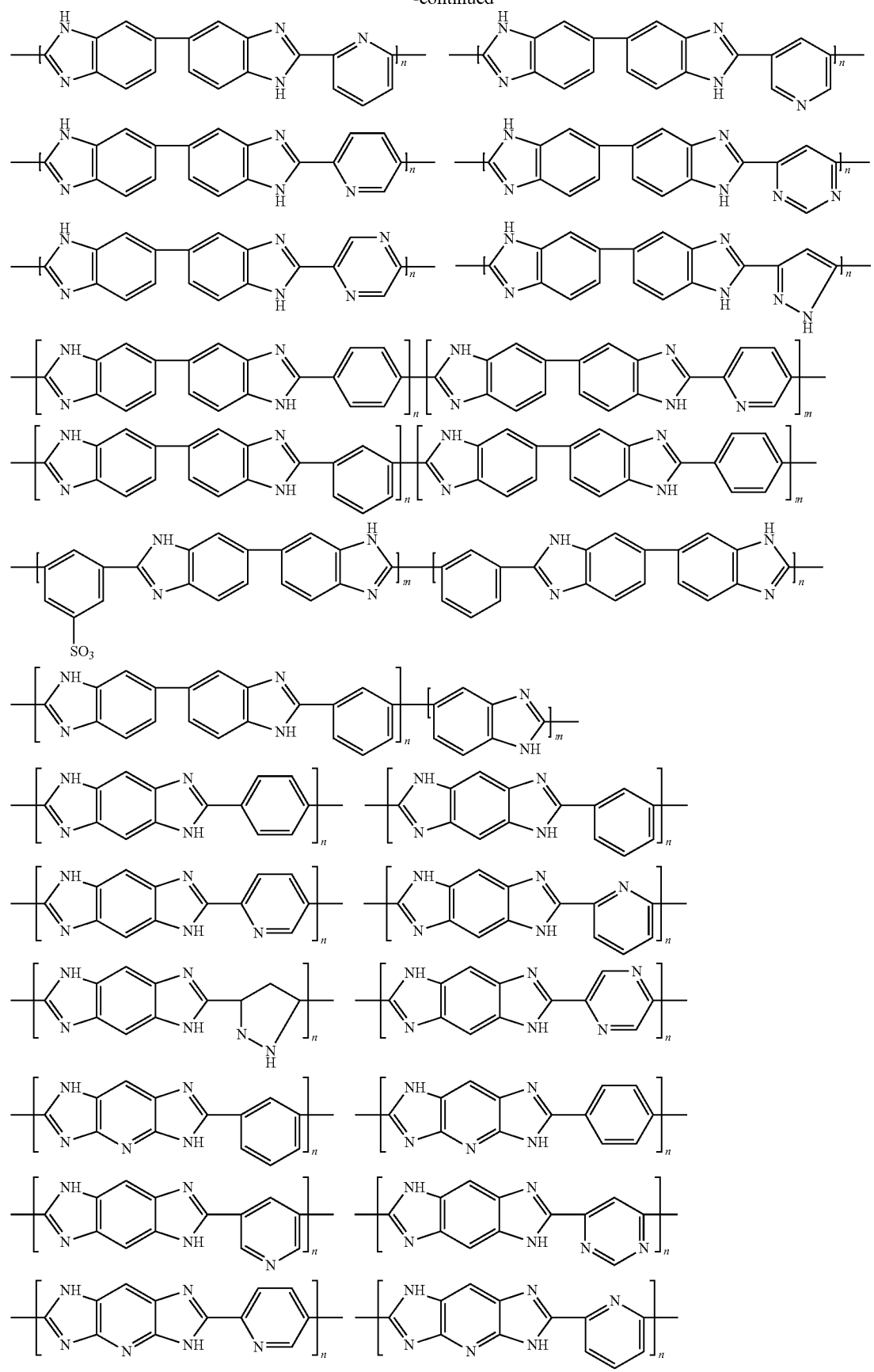

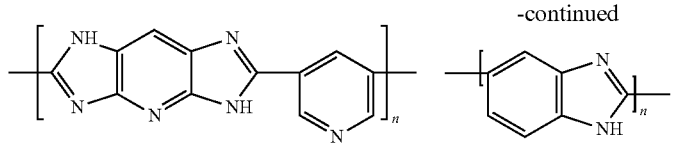

or any combination thereof, in which n and m are each independently 1 or greater. Yet further, n and m may each be independently about 10 or greater. Still again, n and m may each be independently about 100 or greater. Furthermore, a membrane-electrode may include at least two electrodes and at least one PBI membrane produced by the process. Still further, a fuel cell or electrolysis device may include one or more PBI membrane electrode units. The process may also be used to produce acid-doped PBI membranes with higher ionic conductivity and lower mechanical creep as compared to commercially available meta-PBI films.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which:

FIG. 3 shows a table of polymer content, PA content, and PA doping level calculated for a dried and re-doped para-PBI membrane.

FIG. 10 shows a table displaying the polymer content, phosphoric acid content, and acid doping level measured for the 40° C. re-doped dried para-PBI membrane.

FIG. 13 shows a table displaying the polymer content, phosphoric acid content, and acid doping level measured for the 70° C. re-doped dried para-PBI membrane.

FIG. 16 shows a table displaying the polymer content, phosphoric acid content, and acid doping level measured for the 95° C. re-doped dried para-PBI membrane.

FIG. 19 shows a table displaying the polymer content, phosphoric acid content, and acid doping level measured for the dried and room temperature re-doped DiOH-PBI membrane.

FIG. 22 shows a table displaying steady-state creep compliance between files of the current disclosure and the para-PBI gel membrane, measured at 180° C.

FIG. 23 shows a table displaying the polymer content, phosphoric acid content, and acid doping levels between files of the current disclosure and the para-PBI gel membrane.

FIG. 24 shows a table displaying the BET surface area measured for a file of the current disclosure and the para-PBI gel membrane.

FIG. 31 shows a table displaying polymer content, phosphoric acid content, and the phosphoric acid doping level for a conventional meta-PBI and a file of the current disclosure.

FIG. 32 shows a table displaying the BET surface area measured for a conventional meta-PBI and a file of the current disclosure.

FIG. 35 shows a table displaying polymer content, phosphoric acid content, and the phosphoric acid doping level for the comparative m/p-PBI gel membrane.

Figure 1:
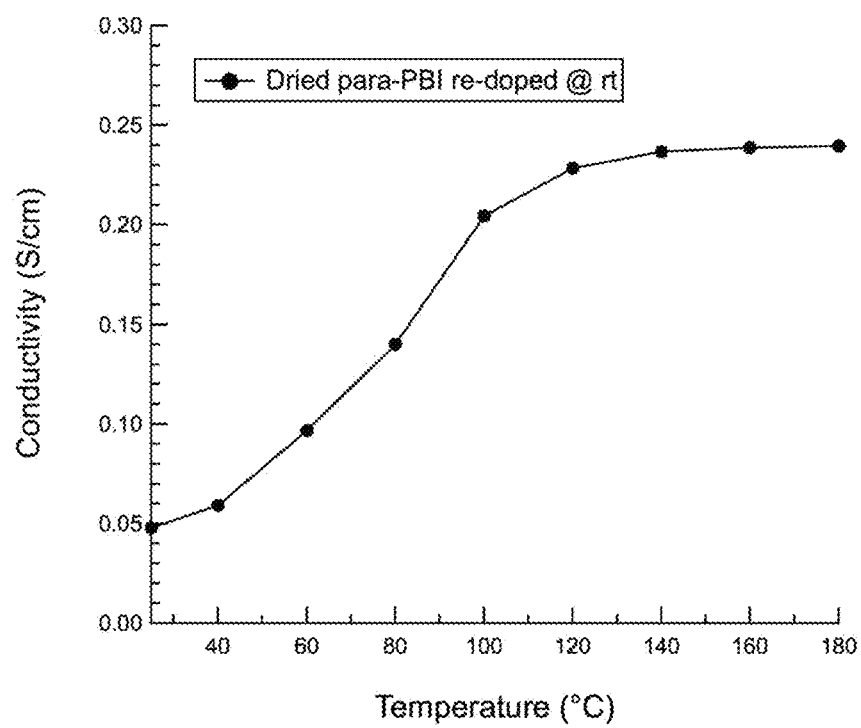
FIG. 1 shows through-plane ionic conductivity of dried and re-doped para-PBI membrane during the second heat ramp.

The figures herein are for illustrative purposes only and are not necessarily drawn to scale.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

As used herein, the terms "weight percent," "wt %," and "wt. %," which can be used interchangeably, indicate the percent by weight of a given component based on the total weight of a composition of which it is a component, unless otherwise specified. That is, unless otherwise specified, all wt % values are based on the total weight of the composition. It should be understood that the sum of wt % values for all components in a disclosed composition or formulation are equal to 100. Alternatively, if the wt % value is based on the total weight of a subset of components in a composition, it should be understood that the sum of wt % values the specified components in the disclosed composition or formulation are equal to 100.

The current disclosure is directed towards membranes that have high ionic conductivities and low mechanical creep (low creep) properties. This combination has not been achieved in previous methods of making doped membranes for applications in fuel cells and electrolysis devices such as electrochemical separation devices, e.g., hydrogen pumps.

The current disclosure teaches a method in which one can achieve acid-doped PBI membranes with high ionic conductivity and low mechanical creep for the first time. This has been achieved by removing PA from PBI gel membranes made in the PPA process, drying the film using a recently discovered technique, and subsequently re-doping the dry film in PA. This unexpected result impacts many applications. It was previously determined that PBI gel membranes made in the PPA process contain high ionic conductivity. However, high mechanical creep associated with PBI gel membranes was found to make a large contribution in limiting the gel membrane's durability. Moreover, the negative results associated with high mechanical creep of the PBI gel membranes is more pronounced as operational temperature is increased and in situations where a differential pressure is applied across the membrane. On the other hand, "conventionally imbibed" PBI membranes contain low mechanical creep, and low ionic conductivity. The current disclosure teaches how those of skill in the art may access the combination of desired properties (high ionic conductivity and low creep) in a single film.

In one embodiment, dried para-PBI that was re-doped into PA was fabricated into a membrane electrode assembly (MEA) and fuel cell performance was tested. Recently, a drying process was discovered in which PPA process PBI gel membranes can be transformed into dense PBI films. This demonstrated, for the first time, the preparation of dense PBI films without casting from an organic solvent. In the current disclosure, it has been discovered that dense PBI films prepared in the drying process can be re-doped in PA to achieve unexpected properties that are unattainable in other methods. Ex-situ characterization such as solids content, acid uptake, ionic conductivity, creep resistance, and BET surface area have been measured to understand the enhanced performance associated with this current disclosure. When operating as a fuel cell, the membranes of the current disclosure achieve a higher voltage at a set current density, as well as more durable behavior at higher temperatures, when compared to PBI gel membranes. In operation in electrolysis, such as in electrochemical hydrogen separation, the membranes made in the current disclosure are able to separate hydrogen more efficiently (lower energy input required), achieve a greater range of operational temperatures, and display enhanced performance when a differential pressure is applied across the membrane.

Through novel processing of PBI gel membranes, enhanced performance and greater durability are achieved when used in high temperature fuel cells and electrolysis devices. The current disclosure improves upon membranes used in high temperature fuel cells and electrolysis devices. Under the herein disclosed new processing techniques, the power density achieved in the fuel cell is increased. In electrochemical hydrogen separation devices, the power input required for separation is lowered. In both devices, the durability of the membrane is increased, including at higher temperatures and differential pressures applied to the membrane.

The new membrane contains a greater content of polymer solids than PBI gel membranes, which leads to enhanced mechanical robustness (reduced creep) while still achieving high ionic conductivity. The mechanical enhancement leads to increased durability at a wider range of operating conditions.

As described further herein, the disclosed PBI membranes are formed according to a method that includes hydrolysis of the PPA polymer solvent, the subsequent solidification of the PBI polymer in the hydrolysis product (PA), removal of PA, a custom drying process, and finally re-doping in PA. It is believed that the in situ hydrolysis and polymer solidification leads to formation of an ordered polymeric matrix that differs in molecular structure from the traditional, organic solution-cast PBI membranes that are cast as a solution of an organic solvent followed by solidification by removal of the organic solvent via, e.g., heating. In particular, it is believed that the PBI gel membrane structure includes a more open and ordered framework as compared to traditional PBI membranes, with the framework of the PBI matrix providing a stable gel membrane that exhibits the improved electrochemical properties as described.

To form PBI gel membranes that may be used with the method of the current disclosure, a polymerization composition can be formed that includes a PPA and the PBI-forming compounds of choice, e.g., PBI-forming monomers. The monomer content of the polymerization composition can generally be low, for instance about 10 wt. % or less, about 8 wt. % or less, or about 5 wt. % or less in some embodiments.

The PBI polymer of the PBI gel membrane can have any PBI structure as is generally known in the art and can be formed by polymerization of PBI-forming compounds including at least one aromatic or heteroaromatic tetraamino compound and at least one aromatic or heteroaromatic polycarboxylic acid or ester, anhydride, or acid chloride thereof or at least one aromatic or heteroaromatic diaminocarboxylic acid. Heteroaromatic compounds encompassed herein include aromatic systems that contain at least one nitrogen, oxygen, sulfur or phosphorus atom in an aromatic ring.

Examples of aromatic and heteroaromatic tetraamino compounds as may be utilized in forming the PBI gel membrane can include, without limitation, 2,3,5,6-tetraminopyridine, 3,3',4,4'-tetraminodiphenylsulfone, 3,3',4,4'-tetraminodiphenyl ether, 3,3',4,4'-tetraminobiphenyl, 1,2,4,5-tetraminobenzene, 3,3',4,4'-tetraminobenzophenone, 3,3',4,4'-tetraminodiphenylmethane and 3,3',4,4'-tetraminodiphenyldimethyl-methane and the salts thereof, e.g., the mono-, di-, tri- and tetrahydrochloride salts, as well as any combination of aromatic or heteroaromatic tetraamino monomers.

In one embodiment, an aromatic polycarboxylic acid can include a dicarboxylic acid. A dicarboxylic acid can be utilized alone or in combination with one or more additional polycarboxylic acid compounds, e.g., tricarboxylic acids and/or tetracarboxylic acids. When incorporated, the content of tricarboxylic acid or tetracarboxylic acids can generally be about 30 mol % or less, for instance from about 0.1 mol % to about 20 mol %, or from about 0.5 mol % to about 10 mol % based on the amount of one or more dicarboxylic acid compounds. An ester of a polycarboxylic acid can be utilized such as C1-C20-alkyl esters or C5-C12-aryl esters of a polycarboxylic acid. An anhydride of a polycarboxylic acid or an acid chloride of a polycarboxylic acid can be polymerized according to disclosed methods.

Examples of aromatic dicarboxylic acids can include, without limitation, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,8-dihydroxynaphthalene-3,6-dicarboxylic acid, diphenylsulfone-4,4'-dicarboxylic acid, isophthalic acid, terephthalic acid, phthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 3-sulfophthalic acid, 5-sulfoisophthalic acid, 2-sulfoterephthalic acid, tetrasulfophthalic acid, tetrasulfoisophthalic acid, tetrasulfoterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, diphenyl ether 4,4'-dicarboxylic acid, benzophenone-4,4'-dicarboxylic acid, biphenyl-4,4'-dicarboxylic acid, 4-trifluoromethylphthalic acid, 2,2-bis(4-carboxyphenyl)hexafluoropropane, 4,4'-stilbenedicarboxylic acid and 4-carboxycinnamic acid or any combination thereof.

Examples of aromatic tricarboxylic acids and esters, acid anhydrides, and acid chlorides thereof can include, without limitation, 1,3,5-benzenetricarboxylic acid (trimesic acid); 1,2,4-benzenetricarboxylic acid (trimellitic acid); (2-carboxyphenyl)iminodiacetic acid, 3,5,3'-biphenyltricarboxylic acid; and 3,5,4'-biphenyltricarboxylic acid; or any combination thereof.

Examples of aromatic tetracarboxylic acids and esters, acid anhydrides, and acid chlorides thereof can include, without limitation, 3,5,3',5'-biphenyltetracarboxylic acid; benzene-1,2,4,5-tetracarboxylic acid; benzophenonetetracarboxylic acid; 3,3',4,4'-biphenyltetracarboxylic acid; 2,2',3, 3'-biphenyltetracarboxylic acid; 1,2,5,6-naphthalenetetracarboxylic acid; and 1,4,5,8-naphthalenetetracarboxylic acid; or any combination thereof.

Heteroaromatic carboxylic acids can include heteroaromatic dicarboxylic acids, heteroaromatic tricarboxylic acids and heteroaromatic tetracarboxylic acids, including their respective esters such as C1-C20-alkyl esters, C5-C12-aryl esters, or the acid anhydrides or the acid chlorides of the heteroaromatic carboxylic acids. Examples of heteroaromatic carboxylic acids include, without limitation, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also their C1-C20-alkyl esters or their C5-C12-aryl esters, or their acid anhydrides or their acid chlorides, or any combination thereof.

In one embodiment, the polymerization composition can include a diaminocarboxylic acid, examples of which include, without limitation, diaminobenzoic acid and the mono and dihydrochloride derivatives of said acid, as well as 1,2-diamino-3"-carboxy acid 4,4'-diphenyl ether, or any combination thereof.

PPA as can be utilized in the polymerization composition can be commercial PPA as obtainable, for example, from Riedel-de Haen. PPA can include concentrated grades of PA ($H_3PO_4$) above 100%. At high concentrations, the individual. $H_3PO_4$ units are polymerized by dehydration and the PPA can be expressed by the formula $H_{n+2}P_nO_{3n+1}$ (n>1).

The PPA [$H_{n+2}P_nO_{3n+1}$ (n>1)] can have a $P_2O_5$ content as calculated by acidimetry of about 70 wt % or more, for instance about 75 wt. % or more, or about 82 wt. % or more, for instance from about 70 wt % to about 86 wt. % in some embodiments. The polymerization composition can be in the form of a solution of the monomers/compounds, or a dispersion/suspension of the monomers/compounds in the PPA, generally depending upon the nature of the compounds to be polymerized and any additional components of the polymerization solution.

The polymerization can be carried out at a temperature and for a time until suitable polymerization of the compounds has taken place, which can generally be determined by an increase in viscosity of the polymerization composition. The increase in viscosity can be determined by visual inspection, through determination of the intrinsic viscosity, or by any other suitable means. For instance the polymerization can continue until the polymerization composition exhibits an intrinsic viscosity of about 0.8 dL/g or greater, for instance about 1.0 dL/g or greater, or about 1.5 dL/g or greater, in some embodiments. The polymerization temperature can generally be about 220° C. or less, for instance about 200° C. or less; such as about 100° C. to 195° C. in some embodiments. The polymerization can be carried out over a time of from a few minutes (e.g., about 5 minutes) up to several hours (e.g., about 100 hours). In one embodiment, the polymerization composition can be heated in a stepwise fashion, for instance in three or more steps, each step lasting from about 10 minutes to about 5 hours and increasing the temperature by about 15° C. or more for each step. Of course, the particular polymerization conditions can be varied, depending generally upon the reactivity and concentration of the particular monomers, as would be evident to one of skill in the art, and no particular polymerization conditions are required in formation of the PBI polymers.

Exemplary PBI polymer repeating units of a PBI gel membrane can include, without limitation:

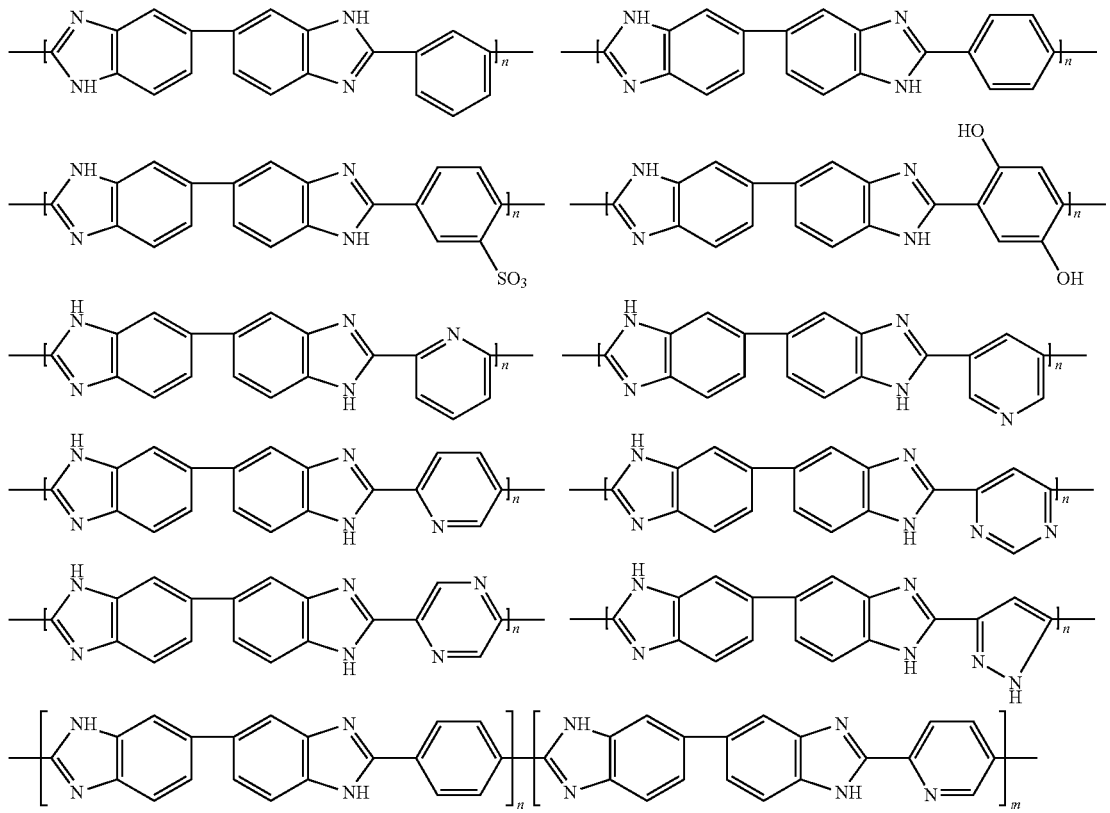

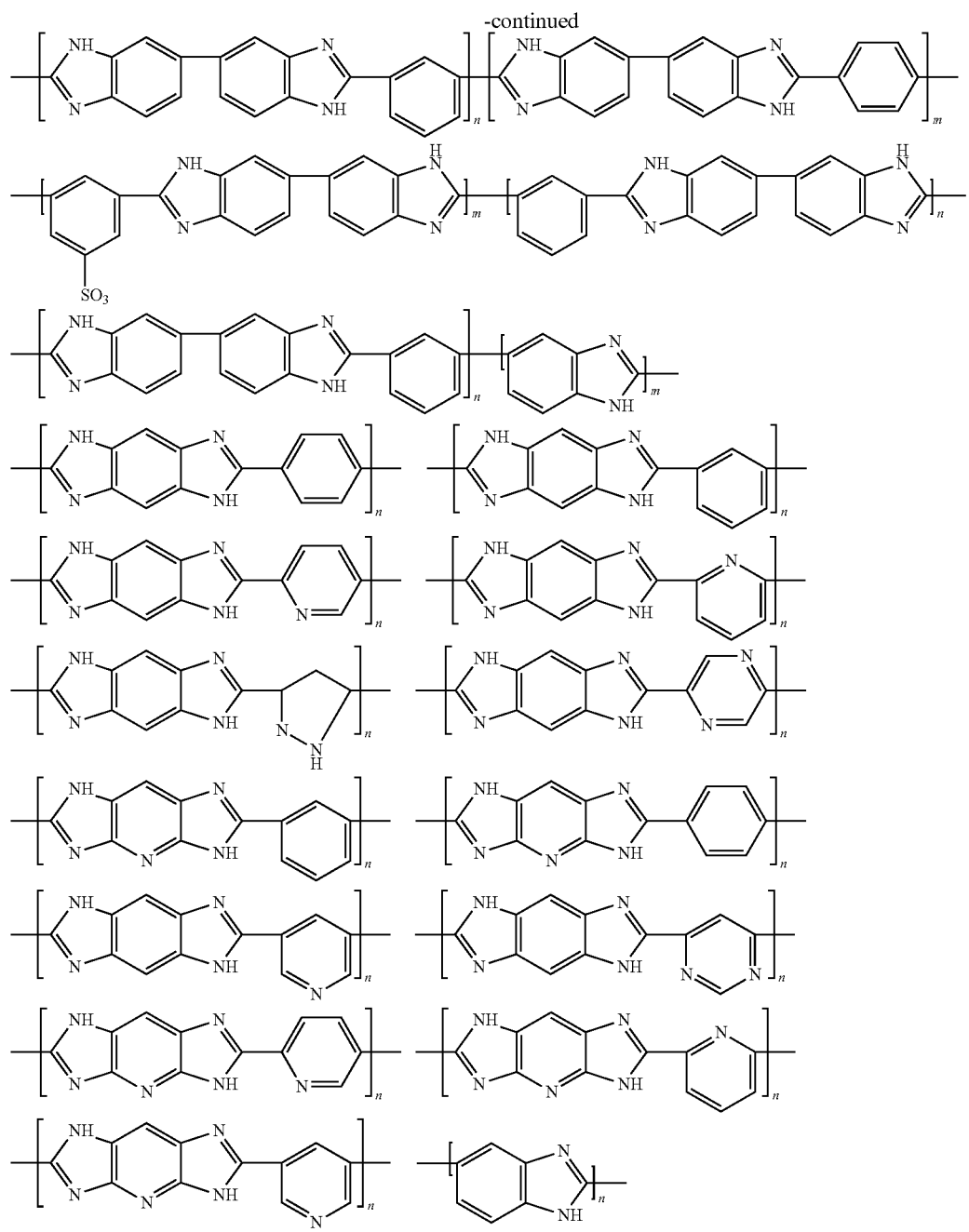

-continued or any combination thereof, in which n and m are each independently 1 or greater, about 10 or greater, or about 100 or greater, in some embodiments.

A PBI polymer of a membrane as disclosed herein can include any repeating unit including any derivatization thereof as is generally known in the art, examples of which are well within the knowledge of one of skill in the art, representative examples of which have been described, for instance in US Patent Application Publication No. 2013/0183603 to Benicewicz, et al., which is incorporated by reference herein.

Following polymerization, the polymer can be in solution in the PPA solvent, and the PBI polymer solution can be processed to form a gel membrane precursor having a desired thickness. Beneficially, the polymer solution as well as the gel membrane precursor and eventual gel membrane and dense PBI membrane formed of the polymer solution can be free of organic solvents.

The membrane precursor can be formed according to any suitable formation process, such as, and without limitation to, casting, spray coating, knife coating, etc. For instance, the gel membrane precursor can be formed to a thickness of from about 20 micrometers (μm) to about 4,000 μm in one embodiment, such as from about 30 μm to about 3,500 μm, or from about 50 μm to about 1,000 μm, in some embodiments.

To solidify the polymer and form the PBI gel membrane, the PBI polymer solution can be treated in the presence of water and/or moisture to hydrolyze at least a portion of the PPA of the solution. Upon hydrolysis, the PPA will hydrolyze to form PA and water, thereby causing a sol-gel transfer of the PBI polymer solution and solidification of the polymer, as the PBI polymer is less soluble in PA as compared to PPA.

The hydrolysis treatment can be carried out at temperatures and for a time sufficient for the gel membrane to solidify so as to be self-supporting and capable of being manipulated without destruction while incorporating high liquid content (e.g., about 60 wt. % or higher liquid content of the total solid and liquid content of the membrane). By way of example, the hydrolysis treatment can be carried out at a temperature of from about 0° C. to about 150° C., for instance from about 10° C. to about 120° C., or from about 20° C. to about 90° C., e.g., at ambient temperature in some embodiments (e.g., at a relative humidity contacting environment of from about 35% to 100%).

The hydrolysis can be carried out by contact of the gel membrane precursor with $H_2O$, for instance in the form of a liquid or vapor, and/or in the presence of other components. For instance, the gel membrane precursor can be contacted with water vapor and/or liquid water and/or steam and/or aqueous PA (e.g., a PA solution having a PA concentration of from about 10 wt. % to about 90 wt. %, e.g., about 30 wt. % to about 70 wt. % or about 45 wt. % to about 55 wt. %). The treatment can be carried out under standard pressure, but this is not a requirement of a formation process, and in some embodiments, the hydrolysis treatment can be carried out under a modified pressure.

In one embodiment, the hydrolysis can be carried out in a climate-controlled environment in which the $H_2O$ content can be tightly controlled. For example, the moisture content of the local environment can be controlled through control of the temperature or saturation of the fluid contacting the precursor membrane. For example, carrier gases such as air, nitrogen, carbon dioxide or other suitable gases can carry $H_2O$, e.g., steam, in a controlled amount for contact with the precursor membrane.

The hydrolysis treatment time can generally vary depending upon parameters such as, e.g., $H_2O$ content and form of the contact, membrane thickness, contact temperature, etc. In general, the hydrolysis treatment can be carried out in a time period of between a few seconds to a few minutes, for instance when the hydrolysis treatment utilizes superheated steam, or alternatively over a period of several days, for example when the hydrolysis treatment is carried out at ambient temperature and low relative atmospheric moisture. In some embodiments, the hydrolysis treatment can be carried out over a period of time between about 10 seconds and about 300 hours, for instance from about 1 minute to about 200 hours. By way of example, in an embodiment in which the at least partial hydrolysis of the PPA of the PBI polymer solution is carried out at room temperature (e.g., about 20° C.) with ambient air of relative atmospheric moisture (i.e., relative humidity) content of from about 20% to 100%, for instance from about 40% to about 80%, the treatment time can generally be between about 5 hours and about 200 hours.

Upon hydrolysis of at least a portion of the PPA of the PBI polymer solution, the polymer can solidify, which form the PBI gel membrane. The PBI gel membrane can in one embodiment have a thickness of from about 15 μm to about 3000 μm, for instance from about 20 μm to about 2000 μm, or from about 20 μm to about 1500 μm, though any particular membrane thickness is not critical. In some embodiments, the PBI gel membrane can have a thickness that is less than that of the membrane precursor. As previously discussed, following hydrolysis, the PBI gel membrane can be self-supporting, even at high liquid content, which is believed to be due to the intra- and intermolecular polymer structures present in the solidified polymeric matrix.

The as-formed PBI gel membrane can in one embodiment have PBI solids content of from about 5 wt. % to about 40 wt. %, for instance from about 8 wt. % to about 30 wt. %, or from about 10 wt. % to about 25 wt. % of the total weight of the membrane including liquid content. The as-formed PBI gel membrane can be self-supporting, for instance having a Young's modulus of about 2.0 MPa or greater, for instance about 3.0 MPa or greater, or about 4.5 MPa or greater in some embodiments as determined for a PBI gel membrane having a thickness of 403 μm and a PBI content of 5 wt. % (e.g., polybenzimidazole).

While one obvious use of the method of the current disclosure is as a fuel cell membrane, the current method is not just limited to this facet and may be employed to produce not only PBI films, but fibers, fibrids, resins, resin beads, papers, microporous resin, sizing, coatings and molding resins. Further, PBI films of the current disclosure may be used in aerospace structures, adhesives, carbon fiber laminates, insulation, syntactic foams, fabrics. Specific applications include, but are not limited to, aircraft seal fire blocking, protective fire-fighting gear, sock hoods, high temperature gloves, aluminized crash rescue gear, flight suits, hazardous work coveralls, filtration systems, glass handling belts, expansion joints, gaskets, packings, resin filler, motor insulation, filament wound composites, lacing for reinforcement fibers, chopped fiber reinforcement for resin matrices, acid scavenger applications, sizings, heat shields, transformer wrap, asbestos replacement, composites, battery separators, tubular insulation, microelectronics processing, wire coatings, gas separation films, protective window and glass coatings, high temperature substrate fil, etc.

Optionally, the PBI gel membrane can be cross-linked, which can further decrease the mechanical creep of the membrane without strongly affecting the desirable electrochemical characteristics of the membranes. The manner of crosslinking as well as the point in the formation process at which the membrane is cross-linked is not particularly limited. For instance, the membrane can be cross-linked following rinsing/washing of the as-formed gel membrane, prior to drying and imbibing the membrane with a supporting electrolyte. In other embodiments, however, the membrane can be cross-linked prior to rinsing/washing, after drying, or following imbibing of the membrane with the supporting electrolyte.

In one embodiment, the PBI membrane can be cross-linked simply by heating in the presence of atmospheric oxygen. Crosslinking can also be effected by the action of radiation, e.g., infrared (IR) radiation (having a wavelength of from about 700 nm to about 1 mm) including near IR (radiation having a wavelength of from about 700 to about 2000 nm or an energy in the range from about 0.6 to about 1.75 eV).

To effect crosslinking, the PBI polymer can incorporate reactive functionality on the polymer chains so as to cross-link with itself or alternatively in conjunction with a cross-linking agent, i.e., a polyfunctional compound that can react with one or more functionalities of the PBI polymer (e.g., amines). Crosslinking agents can include any suitable functionality to effect crosslinking. Suitable crosslinking agents are not particularly limited, examples of which can include, without limitation, epichlorohydrin, diepoxides, diisocyanates, am-dihaloalkanes, diacrylates, and bisacrylamides, particular examples of which can include, without limitation, α,α'-dichloro-p-xylene, chloromethyl methyl ether, bis(chloromethyl) ether, terephthaloyl chloride, succinyl chloride, and dimethyl succinate, as well as combinations of crosslinking agents. In one embodiment, from 1 to 20 equivalents of crosslinking agent can be utilized per available aromatic ring, but crosslinked embodiments of the membranes are not limited to any particular crosslink density.

Further, the PBI of the current disclosure can be imbibed with a supporting electrolyte. The supporting electrolyte of choice can generally depend upon the particular characteristics of the electrochemical device in which the membrane is to be employed, and can include acidic supporting electrolytes, basic supporting electrolytes, as well as neutral species (e.g., water). For instance, the membrane can be imbibed with a mineral acid (e.g., a strong inorganic acid) such as phosphoric acid, hydrochloric acid, nitric acid, fluorosulfonic acid, or sulfuric acid, or a mixture thereof, or a strong organic acid such as acetic acid, formic acid, p-toluene sulfonic acid, or trifluoromethane sulfonic acid or mixtures thereof as well as mixtures of different types of acids, e.g., a combination of a mineral acid and an organic acid. Other examples of supporting electrolytes that can be imbibed in the membrane can include, without limitation, sodium chloride, potassium chloride, sodium hydroxide, potassium hydroxide, sodium sulfide, potassium sulfide, and combinations thereof. By way of example, a supporting electrolyte can include $H_3PO_4$, $H_2SO_4$, HBr, HBr/HCl mixtures, HCl, $NaS_2$, $NaS_2$/NaBr mixtures, $Br_2$ in HBr, $Br_2$ in $H_2SO_4$, $Br_2$ in HBr/$H_2SO_4$ mixtures, etc. Tetraalkylammonium supporting cations can be imbibed in the membranes in one embodiment, with $Et_4N^+$ and $Bu_4N^+$ being two non-limiting examples. A solution of a tetrafluoroborate ($BF^{4-}$), perchlorate ($ClO^{4-}$), or hexafluorophosphate ($PF^{6-}$), or a combination thereof are additional examples of supporting electrolytes that can be imbibed in the membranes. Phosphoric acid of various concentrations is a preferred electrolyte.

The concentration of the supporting electrolyte in the membrane is not particularly limited, and in general a solution that is imbibed in the membranes can include the supporting electrolyte in a concentration of up to about 25 moles/liter (M), for instance from about 0.1 M to about 25 M, from about 0.5 M to about 10 M, or from about 1 M to about 5 M in some embodiments.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure. The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

The following examples better explain the current disclosure.

Example 1: Preparation of Dense Para-PBI Film para-PBI gel membrane made by the PPA Process was first rinsed in a series of deionized water baths to remove phosphoric acid. pH indication paper was employed to ensure complete acid removal before proceeding. The wet thickness was measured to be 356.67±5.8 µm, and membrane dimensions were cut to 45.72 cm×30.48 cm. The wet membrane was placed between two porous polyethylene sheets, the perimeter was clamped to maintain the x-y dimensions. After 24 hours, the polyethylene sheets were removed, revealing a dried, dense PBI film. The film had a uniform thickness of 28 µm.

Example 1A: Room Temperature Re-Doping of Dense Para-PBI Film

The dry para-PBI film prepared in Example 1 was placed in a bath of 85 wt % phosphoric acid at room temperature (rt) for 24 hours. The thickness of the dried and re-doped para-PBI membrane was 150 µm. Through-plane conductivity was measured with a four-probe electrochemical impedance spectroscopy method using a Zahner IM6e electrochemical workstation in the frequency range of 1 Hz to 100 KHz, and an amplitude of 5 mV. The experimental data was fit using a two-component model with an ohmic resistance in parallel with a capacitor. The membrane resistance was obtained from the model simulation and used to calculate the membrane conductivity at different temperatures with the following equation:

$$\sigma = \frac{d}{l \cdot w \cdot R_m}$$

Where d was the distance between inner probes, l was the thickness of the membrane, w was the width of the membrane, and $R_m$ was the ohmic resistance obtained by model fitting. Samples underwent heating ramps to 180° C. twice. The first ramp removed water from the membrane, and the second ramp was used to obtain results free of water. The conductivity of the dried and re-doped para-PBI membrane during the second ramp at 180° C. was 0.24 S/cm (240 mS/cm), see FIG. 1.

Figure 2:
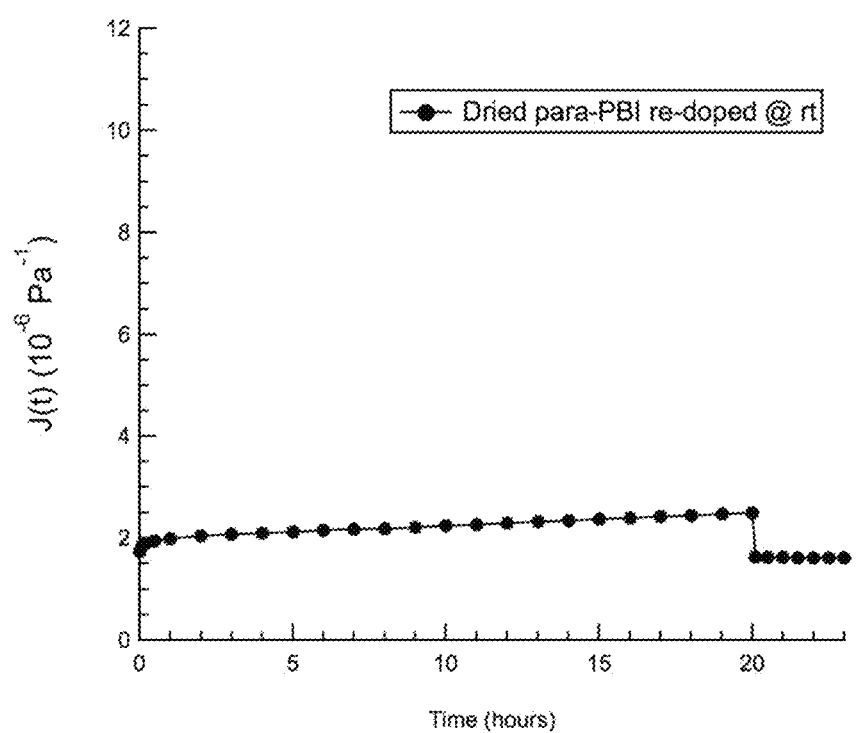
FIG. 2 shows creep compliance of the dried and re-doped para-PBI membrane measured at 180° C.

Compression creep testing was conducted using a TA Instruments RSAIII dynamic mechanical analyzer. Membrane specimens were cut and stacked into a cylinder shape with a diameter of ~6.5 mm and a thickness of ~1.5 mm. The membrane specimens were pre-conditioned in an oven set to 180° C. for 24 hours to mirror the high-temperature operation conditions in a fuel cell. Testing was then completed at 180° C. under a constant compressive stress equal to 0.1 MPa for 20 hours. This was followed by a recovery phase in which the applied stress was removed and for 3 hours. The strain and the stress were recorded as a function of time. The creep compliance was calculated by dividing the time-dependent strain by the applied stress. After a non-linear transition period of 1 to 4 hours, the compliance had a linear increase with time. The steady-state recoverable compliance, $J_s^0$ was then calculated by extrapolating creep compliance in the linear range to t=0. The steady-state creep compliance of the dried and re-doped para-PBI membrane was $2.00 \times 10^{-6}$ Pa$^{-1}$, FIG. 2.

There are three components in the phosphoric acid-doped PBI membranes: acid, water, and polymer. The relative amount of each can be determined through titration. A small sample was isolated and weighed out before adding ~30 mL of deionized water and stirring at room temperature overnight. The mixtures were then titrated with a standard 0.1 N sodium hydroxide solution using a Metrohm 888 DMS Titrando autotitrator. After titration, the samples were washed with deionized water and vacuum dried in an oven at 120° C. for 48 hours. The samples were then weighed to obtain the dry polymer weight. The polymer weight percent and phosphoric acid weight percent were determined, respectively:

$$\text{Polymer } \frac{w}{w}\% = \frac{W_{dry}}{W_{sample}} \cdot 100$$

$$\text{Acid } \frac{w}{w}\% = \frac{M_{acid} \cdot V_{NaOH} \cdot C_{NaOH}}{W_{sample}} \cdot 100$$

where $W_{sample}$ was the weight of the sample before titration, and $W_{dry}$ was the weight of the final dried sample after titration. $M_{acid}$ was the molecular weight of phosphoric acid, $V_{NaOH}$ and $C_{NaOH}$ were the volume and concentration of sodium hydroxide needed to neutralize the phosphoric acid to the first equivalence point, respectively. The phosphoric acid doping level (or the number of moles of phosphoric acid (PA) per mole of PBI repeat unit, X) was calculated according to the following equation:

$$X = \frac{V_{NaOH} \cdot C_{NaOH}}{W_{dry}/M_{polymer}}$$

where $V_{NaOH}$ and $C_{NaOH}$ were the volume and concentration of sodium hydroxide needed to neutralize the phosphoric acid, respectively. $W_{dry}$ was the weight of the final dried sample after titration, and $M_{polymer}$ was the molecular weight of the polymer repeat unit. The polymer wt %, phosphoric acid wt %, and the phosphoric acid doping level calculated for dried and re-doped para-PBI is displayed in the table shown in FIG. 3.

Gas sorption measurements were collected using a Micromeritics ASAP 2020 system. The samples were prepared by neutralizing the dried and re-doped para-PBI membrane samples, followed by freeze drying for a minimum of 48 hours. $N_2$ isothermal data was collected using a liquid nitrogen bath (77 K). The Brunauer-Emmett-Teller (BET) surface area for the dried and re-doped para-PBI membrane was measured as $1005.1 \pm 11.2$ m$^2$/g.

Gas diffusion electrodes (GDE) with a platinum loading of 1.0 mg/cm$^2$ were used in preparation of the membrane electrode assembly (MEA) for fuel cell testing. The MEA was made by hot pressing a piece of membrane between two Kapton-framed electrodes. MEAs were then assembled into single fuel cell test equipment. Fuel cell testing and hydrogen pump testing was performed on 10 cm$^2$ cells. Membranes were left to break-in for 24 hours at 160° C. with an applied constant current density of 0.2 A/cm$^2$, before collecting polarization curve data.

Figure 4:
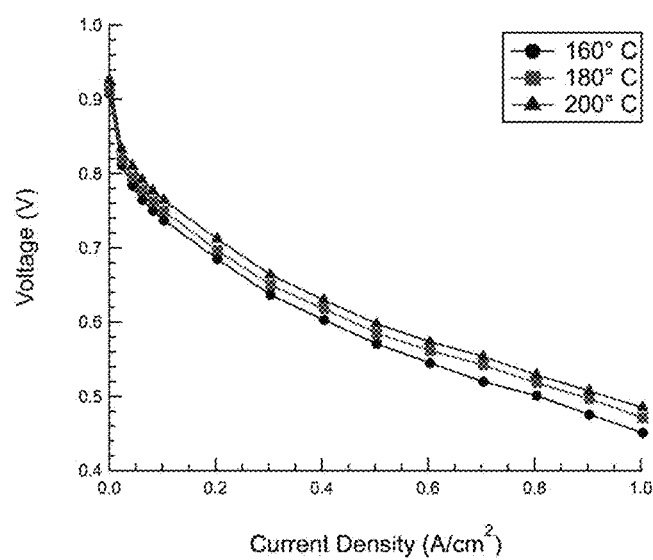
FIG. 4 shows dried and re-doped para-PBI membrane achieved high electrochemical performance in H$_2$/Air fuel cell conditions.

Fuel cell polarization curves were obtained at temperatures of 160, 180, 200° C. with 1.2 stoichiometric flow of $H_2$ supplied to the anode and 2.0 stoichiometric flow of air supplied to the cathode. As displayed in the graph, dried and re-doped para-PBI achieved high electrochemical performance in $H_2$/Air fuel cell conditions, and the performance was further enhanced by operating the fuel cell at greater temperatures, see FIG. 4.

Figure 5:
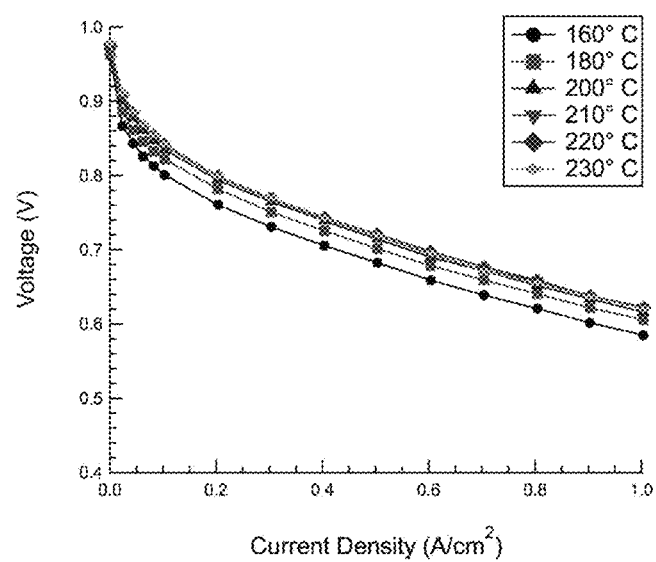
FIG. 5 shows dried and re-doped para-PBI membrane achieved high electrochemical performance in H$_2$/O$_2$, H$_2$/air and reformate/air fuel cell conditions and operating temperatures between 160-230° C.

Fuel cell polarization curves were obtained at temperatures of 160, 180, 200, 210, 220, and 230° C. with 1.2 stoichiometric flow of $H_2$ supplied to the anode and 2.0 stoichiometric flow of $O_2$ supplied to the cathode. The dried and re-doped para-PBI membrane attained good electrochemical performance in the $H_2$/$O_2$ fuel cell with a temperature range of 160–230° C., see FIG. 5. The greater range of operating temperatures and enhanced performance is due to the novel membrane that achieves both high ionic conductivity and high creep resistance, unlike PBIs that have been made from previous methods.

Figure 6:
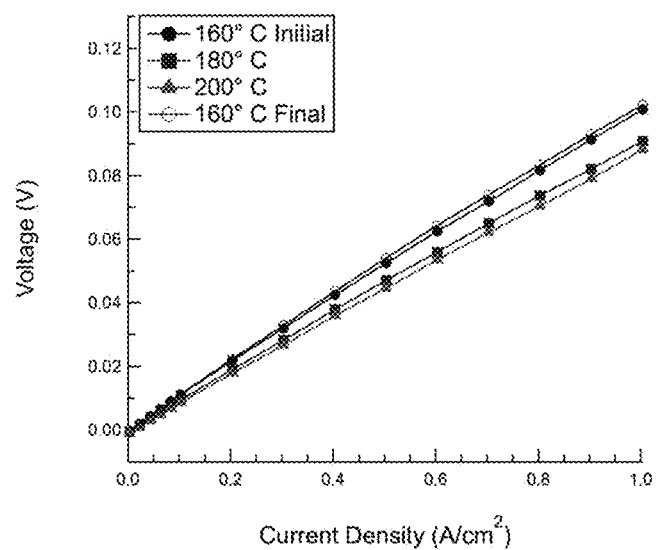
FIG. 6 shows a polarization curve of the dried and re-doped para-PBI membrane when operated as an electrochemical hydrogen pump, an electrolysis device.

Electrochemical hydrogen separation was tested by collecting polarization curves at temperatures of 160, 180, and 200° C. with 1.25 stoichiometric flow of $H_2$ supplied to the anode, no anode back-pressure, and no sweep gas applied to the cathode. From the graph below, by increasing the operating temperature from 160° C. to 200° C., the measured voltage at each current density tested is decreased. This exemplifies that less energy needs to be applied for $H_2$ separation to occur with increasing temperature. The 160° C. final data points fall very close to the initial 160° C. polarization results, indicating that the membrane allows for a variety of operating temperatures without performance losses from membrane degradation, see FIG. 6.

Figure 7:
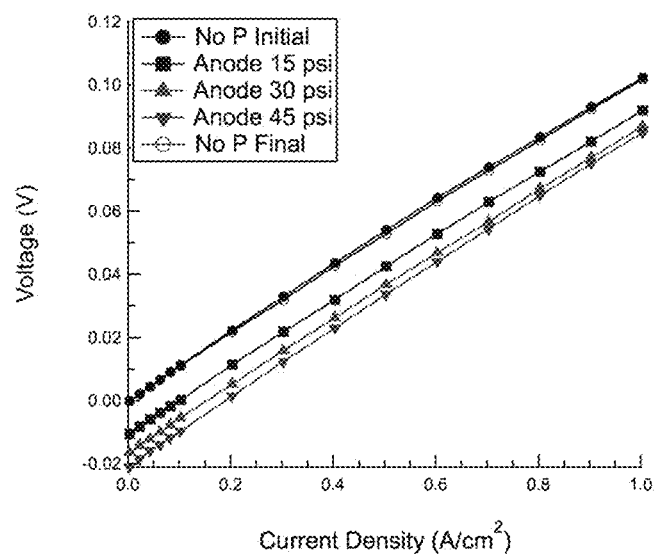
FIG. 7 shows a polarization curve of the dried and re-doped para-PBI membrane when operated as an electrochemical hydrogen pump, an electrolysis device.

Electrochemical hydrogen separation was tested by collecting polarization curves at a constant cell temperature of 160° C. and varying the anode back-pressure. 1.25 stoichiometric flow of $H_2$ was supplied to the anode and no sweep gas to the cathode. From the graph shown at FIG. 7, by increasing the anode back-pressure from initially no pressure to 45 psi, the measured voltage at each current density tested is decreased. This demonstrates that by applying an anode back-pressure, the energy that is required for separation is reduced. The novel membrane process disclosed in this application allows for greater anode back-pressure with enhanced performance, and recoverable operation upon removal of the anode back-pressure. The observed performance is due to both the high conductivity and high creep resistance, achieved for the first time in the disclosed invention.

Example 1B: 40° C. Re-Doping of Para-PBI Film Prepared in Example 1

Figure 8:
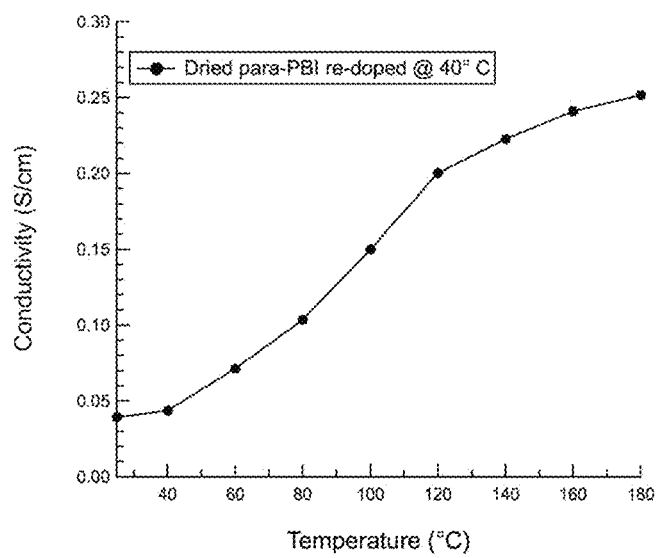
FIG. 8 shows the through-plane ionic conductivity of the 40° C. re-doped dried para-PBI membrane during the second heat ramp.

The dry film with a thickness of 28 μm was placed in a bath of 85 wt % phosphoric acid and heated to 40° C. for 24 hours. The thickness of the 40° C. doped para-PBI was measured to be 155 μm. Through-plane conductivity was measured as described in Example 1A. The conductivity of the 40° C. re-doped dried para-PBI membrane during the second run at 180° C. was 0.25 S/cm, see FIG. 8.

Figure 9:
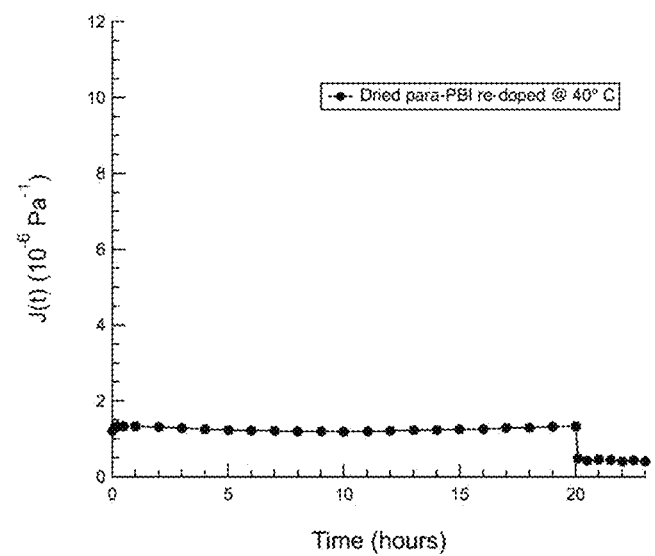
FIG. 9 shows creep compliance of the 40° C. re-doped para-PBI membrane measured at 180° C.

Compression creep was measured as described in Example 1A. The steady-state creep compliance measured at 180° C. of the 40° C. re-doped dried para-PBI membrane was $1.17 \times 10^{-6}$ Pa$^{-1}$, see FIG. 9.

The polymer content, phosphoric acid content, and the phosphoric acid doping level were determine as described in Example 1A. The results of the 40° C. re-doped dried para-PBI membrane is shown in the table in FIG. 10.

Example 1C: 70° C. Re-Doping of the Para-PBI Film Prepared in Example 1

Figure 11:
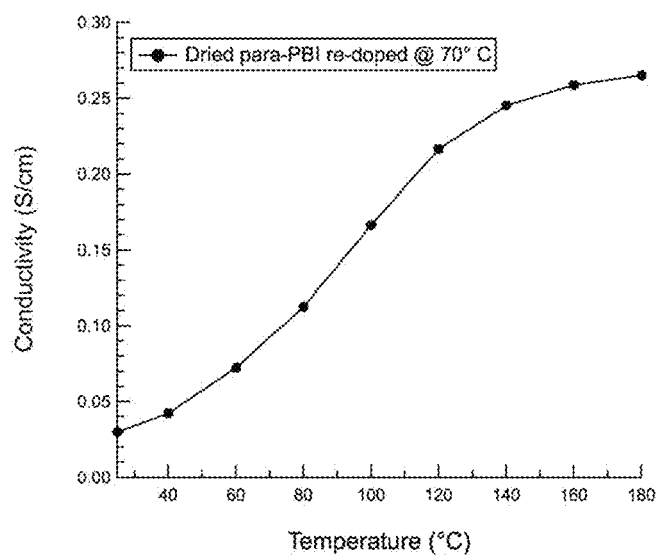
FIG. 11 shows through-plane ionic conductivity of the 70° C. re-doped dried para-PBI membrane during the second heat ramp.

The dry film with a thickness of 28 μm was placed in a bath of 85 wt % phosphoric acid and heated to 70° C. for 24 hours. The thickness of the 70° C. re-doped dried para-PBI was measured to be 157 μm. Through-plane conductivity was measured as previously described in Example 1A. The conductivity of the 70° C. re-doped dried para-PBI membrane measured during the second run at 180° C. was 0.27 S/cm (270 mS/cm) see FIG. 11.

Figure 12:
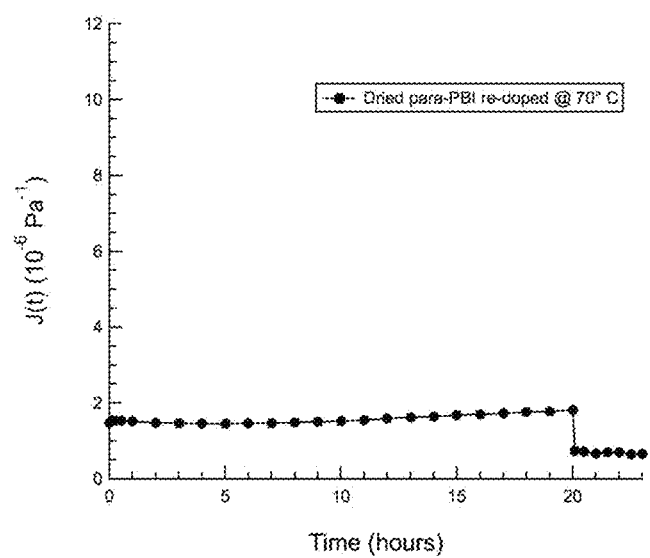
FIG. 12 shows creep compliance of the 70° C. re-doped para-PBI membrane measured at 180° C.

Compression creep was measured as described in Example 1A. The steady-state creep compliance measured at 180° C. of the 70° C. re-doped dried para-PBI membrane was $1.31 \times 10^{-6}$ $Pa^{-1}$, see FIG. 12.

The polymer content, phosphoric acid content, and the phosphoric acid doping level were determine as described in Example 1A. The results of the 70° C. re-doped dried para-PBI membrane is shown in the table at FIG. 13.

Example 1D: 95° C. Re-Doping of Para-PBI Film Prepared in Example 1

Figure 14:
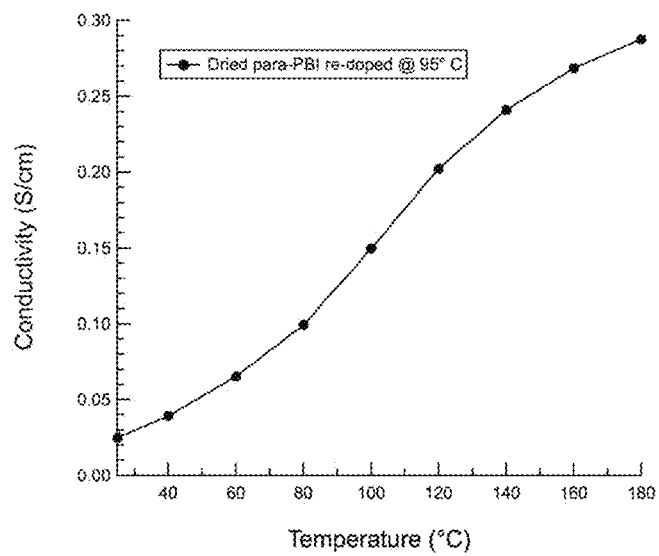
FIG. 14 shows the through-plane ionic conductivity of the 95° C. re-doped dried para-PBI membrane measured during the second heat ramp.

The dry film with a thickness of 28 μm was placed in a bath of 85 wt % phosphoric acid and heated to 95° C. for 24 hours. The thickness of the 95° C. re-doped dried para-PBI membrane was measured to be 143 μm. Through-plane conductivity was measured as previously described in Example 1A. The conductivity of the 95° C. re-doped dried para-PBI membrane during the second run at 180° C. was 0.29 S/cm (290 S/cm), see FIG. 14.

Figure 15:
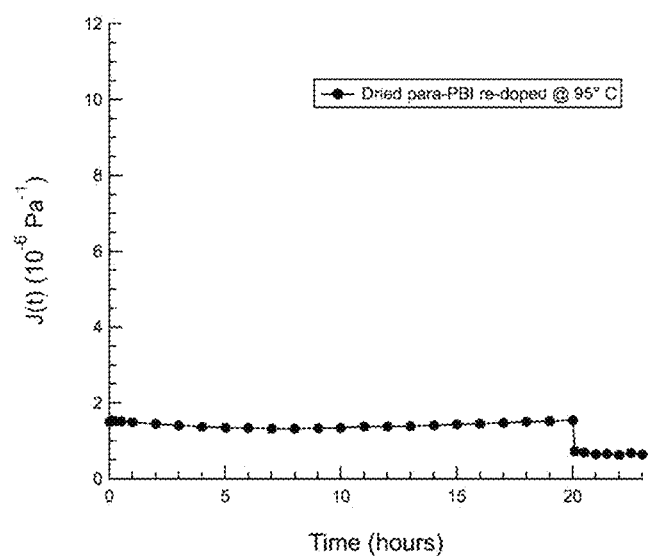
FIG. 15 shows creep compliance measured at 180° C. of the 95° C. re-doped dried para-PBI membrane.

Compression creep was measured as described in Example 1A. The steady-state creep compliance measured at 180° C. of the 95° C. re-doped dried para-PBI membrane was $1.25 \times 10^{-6}$ $Pa^{-1}$, see FIG. 15.

The polymer content, phosphoric acid content, and the phosphoric acid doping level were determine as described in Example 1A. The results of the 95° C. re-doped dried para-PBI membrane is shown in the table at FIG. 16.

Example 2: Preparation of Dense DiOH-PBI Film 2.3381 g of 3,3',4,4'-tetraaminobiphenyl (TAB, 10.91 mmol), 2.1619 g of 2,5-dihydroxyterephthalic acid (DiOH-TPA, 10.91 mmol), and 145.5 g of polyphosphoric acid (PPA) were added to a reaction kettle and stirred in a nitrogen atmosphere with an overhead mechanical stirrer. The polymerization proceeded for 24 hours in a nitrogen atmosphere at 220° C. The solution was applied to a glass substrate by means of a doctor blade with a 15 mil gate thickness and subsequently hydrolyzed for 24 hours. The membrane imbibed in phosphoric acid was rinsed in a series of deionized water baths to remove phosphoric acid. pH indication paper was used to ensure all the acid had been removed before proceeding. The wet thickness was measured as 335.0±31 μm. The wet membrane was placed between two porous polyethylene sheets, clamped along the perimeter to maintain the x-y dimensions and left to dry overnight. After 24 hours, the clamps and porous sheets were removed, revealing a dried, dense PBI film. The film had a uniform thickness of 21±4 μm. The dense DiOH-PBI film was re-doped in a bath of 85 wt % phosphoric acid for at least 24 hours. The thickness of the dense DiOH-PBI re-doped at room temperature was 110 μm.

Figure 17:
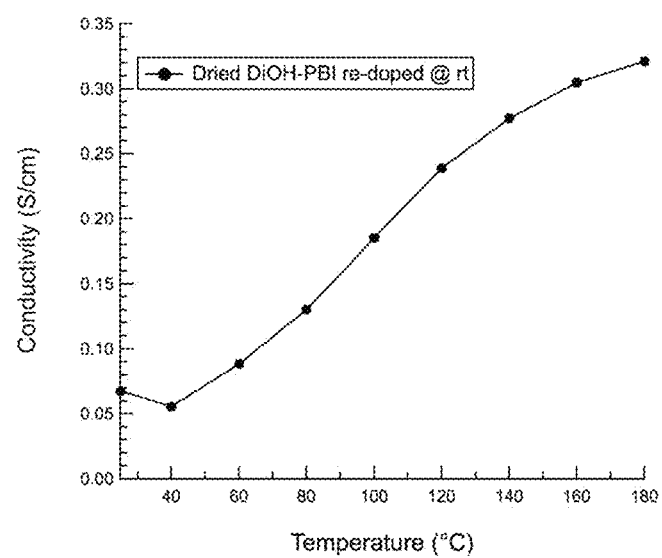
FIG. 17 shows the through-plane ionic conductivity of the dried and room temperature re-doped DiOH-PBI membrane during the second heat ramp.

Through-plane conductivity was measured as previously described in Example 1A. The conductivity of the dried and re-doped DiOH-PBI membrane during the second run at 180° C. was 0.32 S/cm (320 mS/cm), see FIG. 17.

Figure 18:
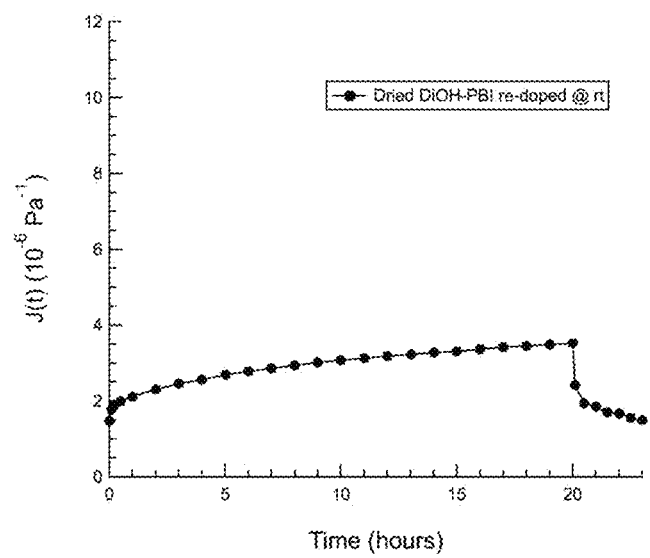
FIG. 18 shows creep compliance of the dried and room temperature re-doped DiOH-PBI membrane, measured at 180° C.

Compression creep was measured as described in Example 1A. The steady-state creep compliance of the dried and re-doped DiOH-PBI membrane was $2.46 \times 10^{-6}$ $Pa^{-1}$, see FIG. 18.

The polymer content, phosphoric acid content, and the phosphoric acid doping level were determine as described in Example 1A. The results of the dried and re-doped DiOH-PBI membrane is displayed in the table at FIG. 19.

COMPARATIVE EXAMPLES

Comparative Example 1: Preparation of Para-PBI Gel Membrane

Figure 20:
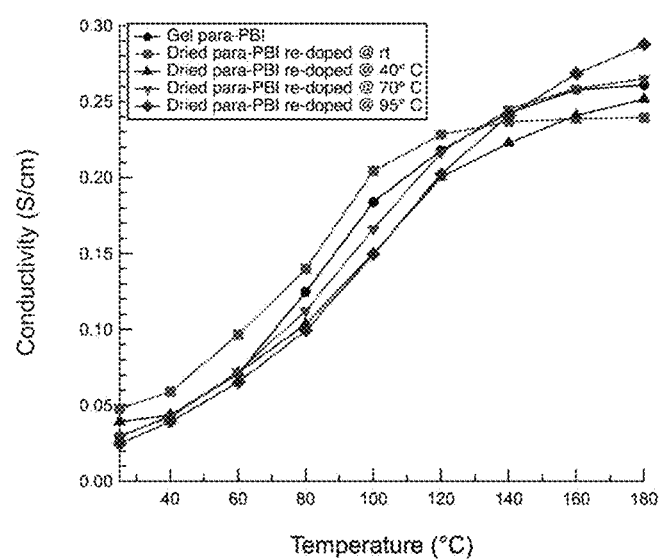
FIG. 20 shows the through-plane ionic conductivity between files of the current disclosure and the para-PBI gel membrane during the second heat ramp.

Para-PBI made in the PPA Process was used as previously prepared, in the acid-doped gel state. This membrane was not washed and dried as described previously. Through-plane conductivity was measured as described in Example 1A. The thickness of the para-PBI gel membrane was 350 μm. The conductivity of the para-PBI gel membrane during the second run at 180° C. was 0.26 S/cm (260 mS/cm), see FIG. 20.

Figure 21:
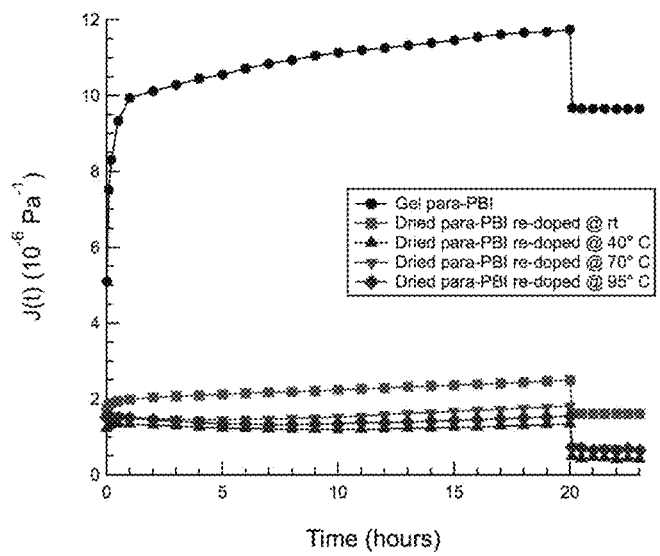
FIG. 21 shows creep compliance between files of the current disclosure and the para-PBI gel membrane, measured at 180° C.

Compression creep was measured as described in Example 1A. The graph, see FIG. 21, of creep compliance with time is displayed for the para-PBI gel membrane. Data for the dried and re-doped para-PBI membranes described in this disclosure have been included for ease of comparison.

The steady-state creep compliance for the para-PBI gel membrane and the dried an re-doped para-PBI membranes prepared as described in this disclosure are displayed in the table at FIG. 22.

The polymer content, phosphoric acid content, and the phosphoric acid doping level were determined as described in Example 1A. Data collected for the comparative para-PBI gel membrane and the dried and re-doped para-PBI membranes, prepared according to the current disclosure, are displayed in the table at FIG. 23.

Gas sorption measurements were collected using a Micromeritics ASAP 2020 system. The samples were prepared by neutralizing the re-doped para-PBI membrane samples, followed by freeze drying for two days. $N_2$ isothermal data was collected using a liquid nitrogen bath (77 K). Data for the para-PBI gel membranes and dried and re-doped para-PBI membrane, prepared according to the current disclosure, are displayed in the table at FIG. 24.

Figure 25:
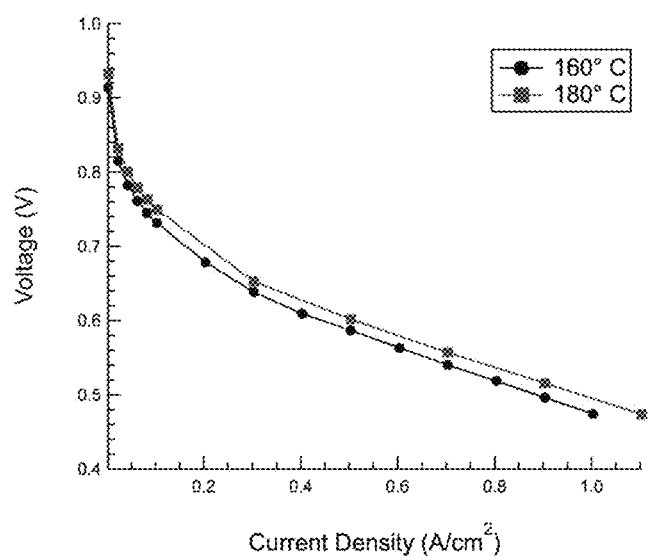
FIG. 25 shows fuel cell polarization curves obtained in H$_2$/Air conditions for the comparative para-PBI gel membrane at temperatures of 160 and 180° C.

MEAs were constructed as described in Example 1A. Fuel cell polarization curves were obtained for the para-PBI gel membrane, displayed below at temperatures of 160, and 180° C. 1.2 stoichiometric flow of $H_2$ was supplied to the anode with no anode back-pressure, and 2.0 stoichiometric flow of air was supplied to the cathode, see FIG. 25.

Figure 26:
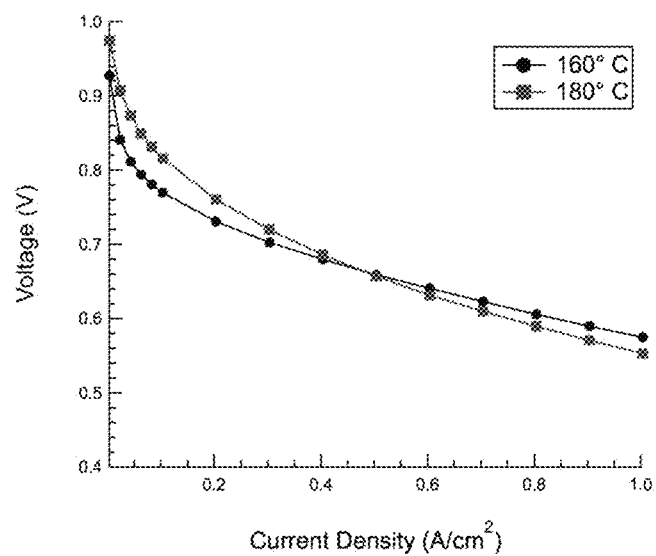
FIG. 26 shows fuel cell polarization curves obtained in H$_2$/O$_2$ conditions for the comparative para-PBI gel membrane at temperatures of 160 and 180° C.

Fuel cell polarization curves were obtained for the gel para-PBI membrane, displayed below at temperatures of 160 and 180° C. 1.2 stoichiometric flow of $H_2$ was supplied to the anode, with no anode back-pressure, and 2.0 stoichiometric flow of oxygen supplied to the cathode, see FIG. 26.

Figure 27:
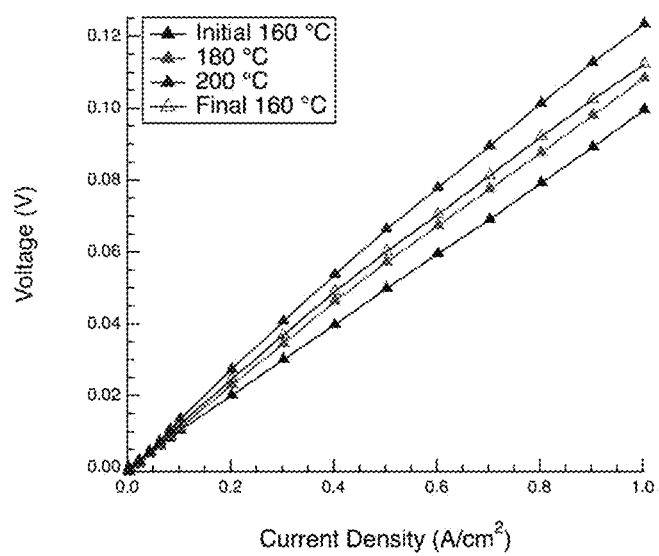
FIG. 27 shows a polarization curve of the comparative para-PBI gel membrane when operated as an electrochemical hydrogen pump, an electrolysis device, with increasing cell operation temperature.

Electrochemical hydrogen separation was tested by collecting polarization curves at temperatures of 160, 180, and 200° C. for the para-PBI gel membrane. $H_2$ with a 1.25 stoichiometric flow was supplied to the anode with no additional back pressure and no sweep gas applied to the cathode. As displayed in FIG. 27, by increasing the operating temperature from 160° C. to 200° C., the voltage at each current density is increased. The low-solids PBI gel membrane is unable to take advantage of increased reaction kinetics that come with increased operation temperature. This is due to accelerated creep with increased temperature that is associated with the low-solids para-PBI gel membrane. The 160° C. final data points lie significantly higher than the initial 160° C. polarization results. This observation indicates that the creep-induced degradation at greater operation temperatures is not recoverable. In the disclosed invention, the opposite trend is observed due to increased solids content and enhanced creep resistance, see FIG. 27.

Figure 28:
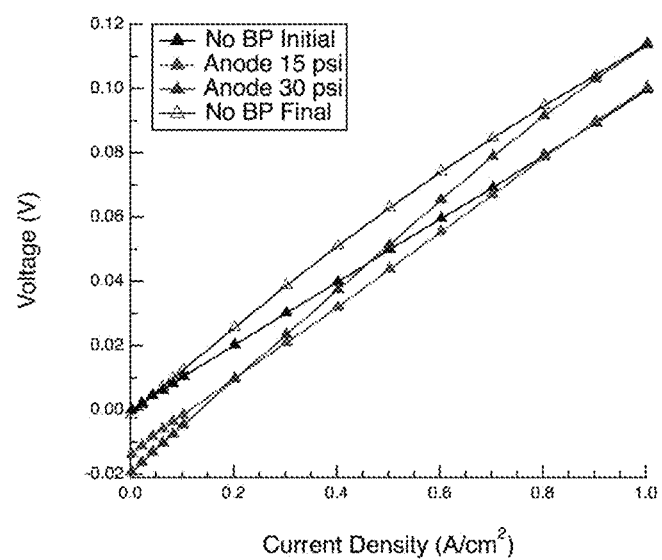
FIG. 28 shows a polarization curve of the para-PBI gel membrane when operated as an electrochemical hydrogen pump, an electrolysis device, with increasing anode back-pressure.

Electrochemical hydrogen separation was tested by collecting polarization curves at a constant cell temperature of 160° C. and varying the anode back-pressure. 1.25 stoichiometric flow of $H_2$ was supplied to the anode and no sweep gas to the cathode. From the in FIG. 28, by increasing the anode back-pressure to 15 psi, the recorded voltage is decreased. However, when the anode back-pressure is further increased to 30 psi, the voltage begins to increase, especially at higher current densities. The anode back-pressure was increased further to 45 psi but displayed no practical performance in the current range. After removing the applied back-pressure, the original standard pressure performance is non-recoverable. The low-solids para-PBI gel membrane succumbs to creep degradation, which derives its poor durability and a limited range of operating conditions, see FIG. 28.

Comparative Example 2: Preparation of Conventionally Imbibed Meta-PBI Film

Figure 29:
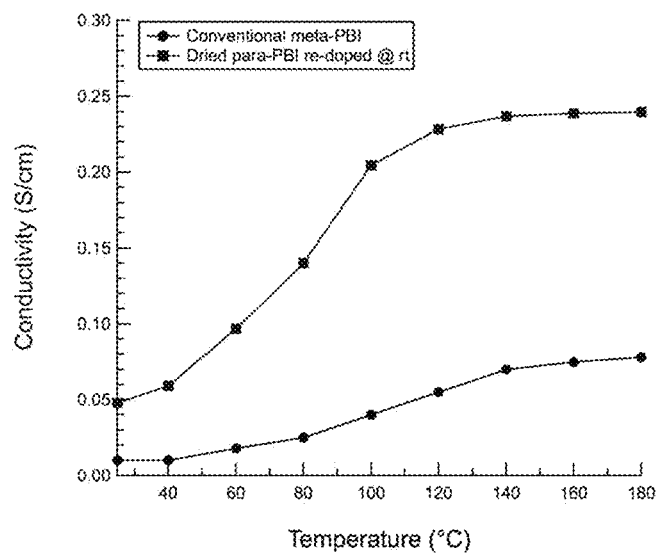
FIG. 29 shows a comparative example of the through-plane ionic conductivity measured during the second heat ramp between a file of the current disclosure and doped commercially available meta-PBI film.

Commercially available meta-PBI film was prepared by casting and drying N,N-dimethylacetamide solutions and used as received as a dense film. The film was placed in 85 wt % phosphoric acid for at least 24 hours before testing. The doped meta-PBI film had a thickness of 90 μm. Through-plane conductivity was measured as previously described in Example 1A. The conductivity of the conventionally imbibed meta-PBI film during the second run at 180° C. was 0.08 S/cm (80 mS/cm). As displayed at FIG. 29, the conventionally imbibed meta-PBI achieves an ionic conductivity much lower to the membrane disclosed in this invention.

Figure 30:
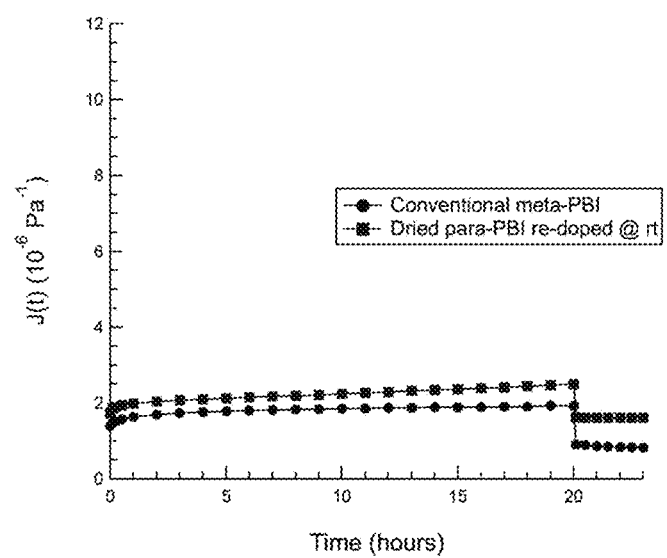
FIG. 30 shows a comparative example of the creep compliance between a file of the current disclosure and doped commercially available meta-PBI film, measured at 180° C.

Compression creep was measured as described in Example 1A. The steady-state creep compliance of the conventionally imbibed meta-PBI membrane was $1.75 \times 10^{-6}$ $Pa^{-1}$, see FIG. 30. Membranes fabricated according to the current disclosure are able to achieve a similar steady-state creep compliance.

The polymer content, phosphoric acid content, and the phosphoric acid doping level were determined as described in Example 1A, see the table at FIG. 31.

Gas sorption measurements were collected using a Micromeritics ASAP 2020 system. The samples were prepared by neutralizing the acid-doped membrane sample in water, followed by freeze drying for two days. $N_2$ isothermal data was collected using a liquid nitrogen bath (77 K), see the table at FIG. 32.

Figure 33:
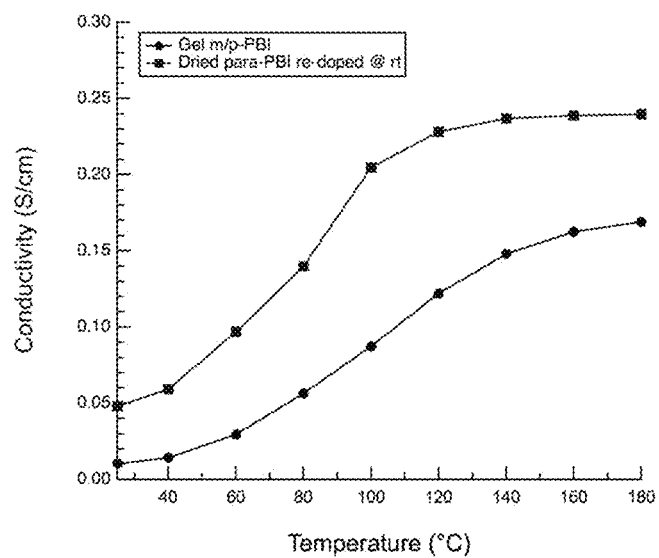
FIG. 33 shows the through-plane ionic conductivity measured for the m/p-PBI gel membrane and a film of the current disclosure during the second heat ramp.

Comparative Example 3: m/p-PBI Gel 1027 g of PPA was added to a reaction kettle charged with 64.2810 g (300.00 mmol) of 3,3',4,4'-tetraaminobiphenyl, 43.6118 g (262.52 mmol) of isophthalic acid, and 6.2303 g (37.50 mmol) of terephthalic acid. While stirring under a nitrogen atmosphere, the mixture was polymerized at 190° C. for 20 hours. The solution was then applied by means of a doctor blade onto a polyester film and subsequently hydrolyzed for 24 hours. This membrane was not washed and dried as described previously. Through-plane conductivity was measured as described in Example 1A. The conductivity of the m/p-PBI gel membrane was measured during the second run at 180° C. as 0.17 S/cm (170 mS/cm), see FIG. 33. This m/p-PBI gel membrane displays an ionic conductivity significantly lower than the membrane produced in the current disclosure.

Figure 34:
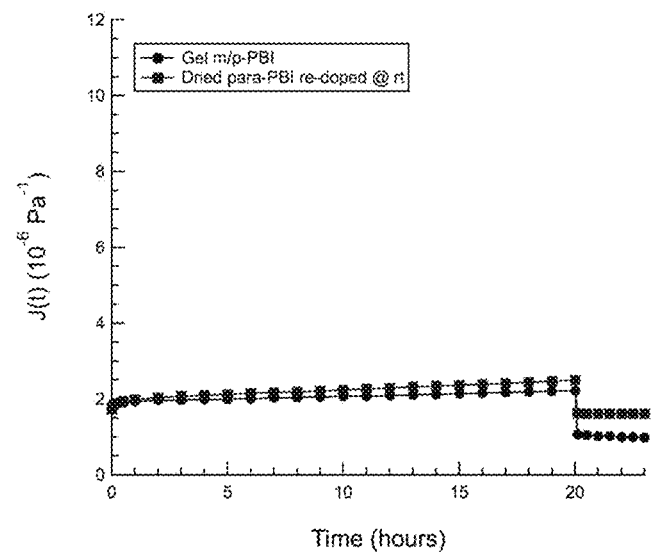
FIG. 34 shows a comparative example of the creep compliance between a file of the current disclosure and the m/p-PBI gel membrane, measured at 180° C.

Compression creep was measured as described in Example 1A. The steady-state creep compliance of the m/p-PBI membrane was $1.92 \times 10^{-6}$ $Pa^{-1}$, see FIG. 34. This is similar to the steady-state creep compliance of the membrane of the current disclosure.

The polymer content, phosphoric acid content, and the phosphoric acid doping level were determined as described in Example 1A. The data collected for the gel m/p-PBI is displayed in the table at FIG. 35.

Figure 36:
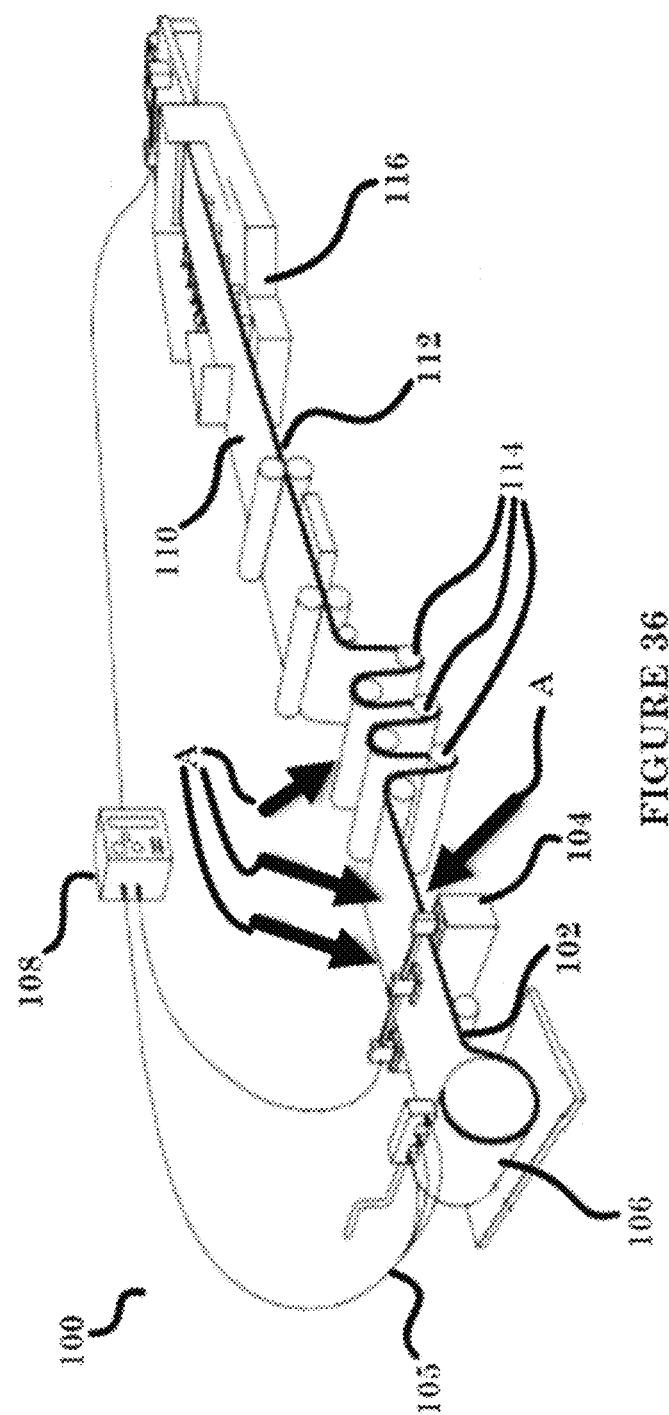
FIG. 36 shows a continuous formation process that may be used to form a dense PBI membrane described in this disclosure.

While the examples disclose placing the PBI gel membranes in contact with a substrate such as a porous sheet during the drying process, the substrate may include a variety of materials such as porous or non-porous substrates. In addition, the current disclosure discloses that the various PBI gels may be placed between two porous sheets, but also may be placed between a porous sheet and a non-porous sheet or only placed in contact with a porous or nonporous sheet without an opposing sheet on the other side of the PBI gel membrane. The membrane may also be dried in a continuous process with or without the use of a supporting sheet. Dry gas flows may be used on one or two sides of the supported or self-supporting membrane to promote the drying process as shown in FIG. 36.

With respect to processing, the PBI membranes of the current disclosure may be restrained and/or tensioned in the X, Y, and Z plane directions. Herein, "restrained" may be used to mean simply fastening a PBI membrane in place without placing a stretching or tensional force on the PBI membrane to stretch the membrane from its original shape. "Tensioning" meanwhile may be used to mean applying a stretching or tensional force on the PBI membrane to render it taught across its surfaces in the X and/or Y plane directions or to increase its length in the X and/or Y plane directions. In a preferred embodiment, the PBI membrane is restrained and/or tensioned in the X and Y plane directions, but left unrestrained and not tensioned in the Z plane direction. Further, drying of the membrane may simply be allowing the PBI membrane to air dry. However, in a further embodiment, one may employ a gas feed directed onto a restrained or tensioned film, such as a dry gas, air, or nitrogen, to speed the drying process. Still further, the PBI film may be restrained in a width direction and dry gas, air, nitrogen passed over either one or both surfaces of the tensioned film.

The current disclosure also has a direct impact on film processing applications for PBI films formed pursuant to the current disclosure. In one embodiment, the current disclosure may be combined with continuous film making processes as known to those of skill in the art. For instance, as shown in FIG. 36, a continuous formation process 100 could be used to form a PBI membrane 102 via a continuous process whereby a pre-formed PBI membrane 102 may be directly deposited on a film tensioner surface 104, which may restrain the film in the X, Y, and/or Z plane directions or may place tension by pulling PBI membrane 102 in the X, Y, and/or Z plane directions, either simultaneously or separately. Or, instead, PBI membrane 102 may be applied as a solution 105 to a substrate surface 106, such as a quench drum, air roller, porous surface, etc., as known to those of skill in the art, to form PBI membrane 102. Additional steps may be added that submerge the cast solution and substrate into baths that contain a mixture of phosphoric acid and water that assist in the completion of the sol-gel process, and additionally water baths that remove the phosphoric acid and replace it with water. Thus, the process of the current disclosure may accommodate both preformed or freshly-formed PBI membranes 102 in a continuous assembly process, all under the direction of a controller 108. Drying gases, represented by arrows A, may be applied to PBI membrane top surface 110 and/or bottom surface 112 throughout process 100. Further, serpentine rolls 114 may be used to help tension, as well as allow for further drying, as PBI membrane 102 passes along the continuous formation process 100. After PBI membrane 102 is tensioned and dried, the membrane may be further processed 116 by cutting, rolling, etc., as known to those of skill in the art for processing PBI membrane 102.

The current disclosure provides many benefits to the PBI industry. Foremost, there is no use of organic solvents in the formation process. Second, the current disclosure opens avenues to work with PBI polymers that previously were of low interest for the very fact they could not be dissolved in organic solvents. The current process allows a wider variety of chemistries to be employed.

Further, the method of the current disclosure may be used to form films with thicknesses of 5-150 microns, more preferably 5-100 microns, and even more preferably, 10-50 microns. In a further embodiment, thickness may range from 5-250 microns, more preferably, 20-200 microns, and even more preferably, 50-150 microns.

In a further embodiment, the current disclosure provides processes for re-doping a dense membrane in PA to form a membrane that has an ionic conductivity greater than 180 mS/cm at 180° C. and more preferably greater than 200 mS/cm at 180° C., combined with a steady state creep compliance $J_s^0$ of less than $5 \times 10^{-6}$ $Pa^{-1}$ and more preferably less than $3 \times 10^{-6}$ $Pa^{-1}$ when measured at 180° C. Further, the membranes may have BET surface area greater than 600 $m^2/g$.

All patents, patent applications, published applications, and publications, databases, websites and other published materials referred to throughout the entire disclosure herein, unless noted otherwise, are incorporated herein by reference in their entirety.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A process for making a polybenzimidazole film comprising:
   forming a polymerization composition comprising a polyphosphoric acid, an aromatic or heteroaromatic tetraamino compound, and an aromatic or heteroaromatic polycarboxylic acid compound, wherein the aromatic or heteroaromatic carboxylic acid compound comprises an aromatic or heteroaromatic polycarboxylic acid or ester, anhydride, or acid chloride thereof and/or comprises an aromatic or heteroaromatic diaminocarboxylic acid;
   polymerizing the aromatic or heteroaromatic tetraamino compound with the aromatic or heteroaromatic carboxylic acid compound to form a polymer solution comprising a pol benzimidazole dissolved in the polyphosphoric acid;
   shaping the polymer solution to form a membrane precursor comprising the polymer solution;
   hydrolyzing at least a portion of the polyphosphoric acid to form phosphoric acid and water, upon which the membrane precursor forms a gel membrane comprising the polybenzimidazole, the gel membrane being a self-supporting membrane capable of incorporating a liquid content of about 60 wt. % or more without loss of structure;
   rinsing the gel membrane;
   restraining the gel membrane in an X-Y plane direction;
   drying the rinsed gel membrane as it is restrained to form a dried film; and
   immersing the dried film into an inorganic or organic acid bath.

2. The process of claim 1, wherein the acid bath comprises a phosphoric acid.

3. The process of claim 1, wherein the acid bath is at a temperature of 29° C. to 120° C.

4. The process of claim 1, wherein the acid bath is at a temperature of 20° C. to 95° C.

5. The process of claim 1, wherein following the step of hydrolyzing, the gel membrane has a solids content of from about 5 wt. % to about 40 wt. % of the gel membrane.

6. The process of claim 1, wherein the step of drying the rinsed gel membrane as it is restrained comprises placing the gel membrane in contact with one or more substrates wherein at least one substrate is a porous substrate.

7. A polybenzimidazole film comprising an inorganic or organic acid imbibed therein, the polybenzimidazole film having a thickness of 5 microns to 150 microns, wherein the polybenzimidazole film exhibits an ionic conductivity measured at 180° C. greater than 180 mS/cm and exhibits a steady state creep compliance of less than $5 \times 10^{-6}$ $Pa^{-1}$ when measured at 180° C.

8. The polybenzimidazole film of claim 7, wherein the polybenzimidazole film has a BET surface area greater than 600 $m^2/g$.

9. The polybenzimidazole film of claim 7, wherein the polybenzimidazole film comprises a polybenzimidazole that includes one or more of the following repeat units:

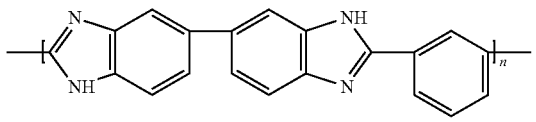 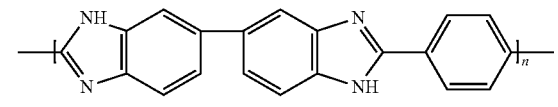

-continued
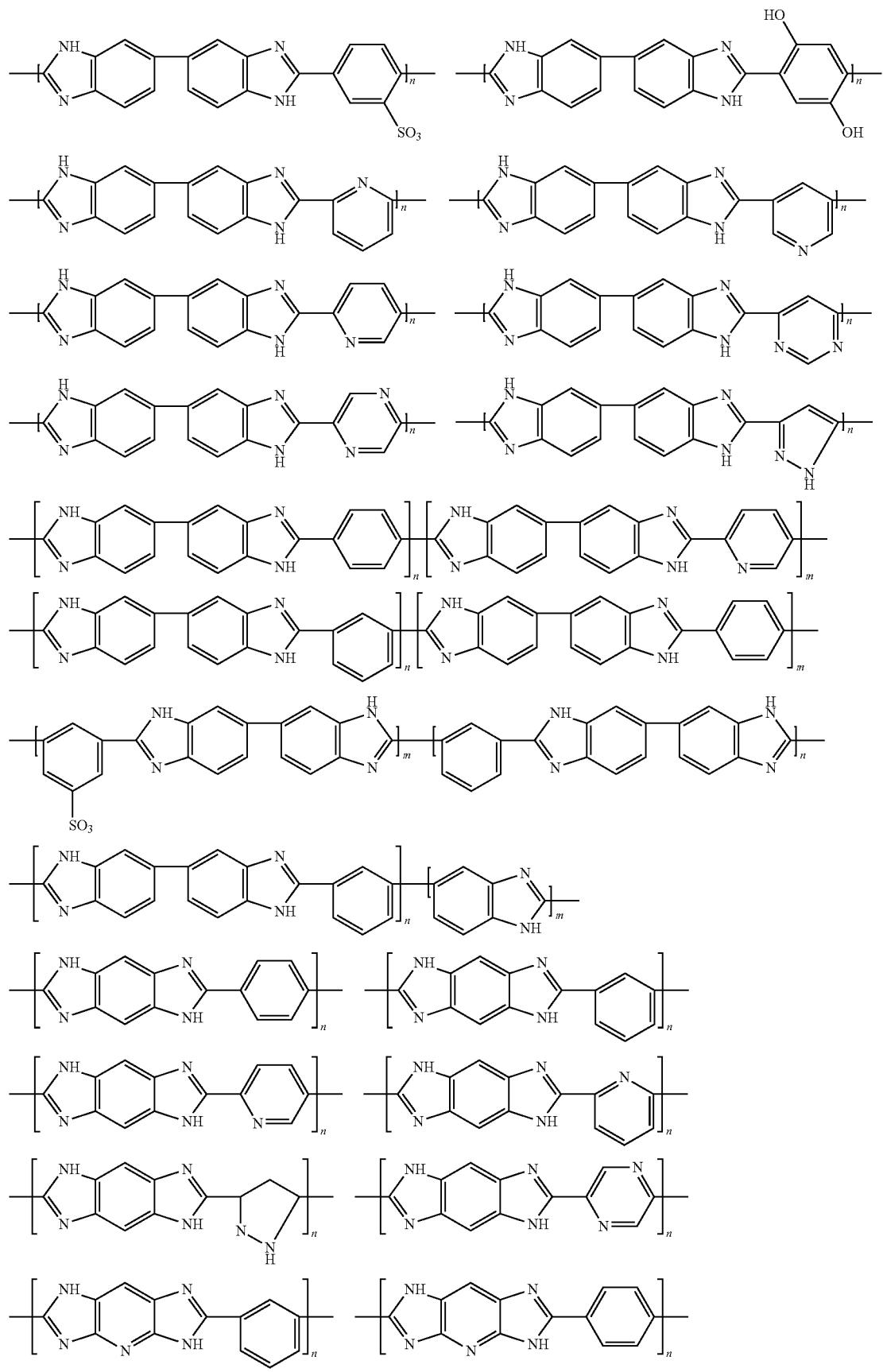

-continued

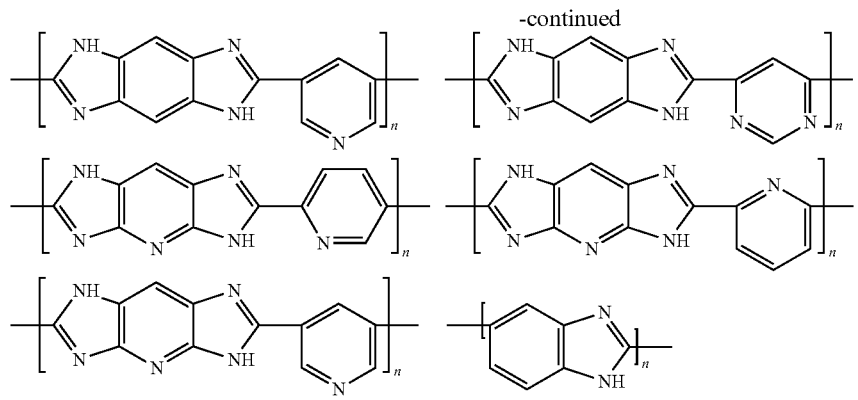

or any combination thereof, in which n and m are each independently 1 or greater.

10. The polybenzimidazole film of claim 9 in which n and m are each independently about 10 or greater.

11. The polybenzimidazole film of claim 10, wherein the polybenzimidazole film exhibits a steady state creep compliance of less than $3 \times 10^{-6}$ Pa$^{-1}$ when measured at 180° C.

12. The polybenzimidazole film of claim 9 in which n and m are each independently about 100 or greater.

13. A membrane-electrode unit comprising two electrodes and the polybenzimidazole film of claim 7.

14. A fuel cell or electrolysis device comprising the membrane electrode unit of claim 13.

15. The polybenzimidazole film of claim 7, wherein the polybenzimidazole film exhibits an ionic conductivity measured at 180° C. greater than 200 mS/cm.

* * * * *